(12) United States Patent
Mazabraud et al.

(10) Patent No.: US 8,981,039 B2
(45) Date of Patent: Mar. 17, 2015

(54) CAPROLACTAM-BASED COMPOSITION, PROCESS FOR MANUFACTURING AN IMPERMEABLE ELEMENT, AND TANK

(71) Applicants: Philippe Mazabraud, Orleans (FR); Elodie Chauvot, Ecuisses (FR); Laurent Delnaud, Ballan-Mire (FR); Katia Barral, Versailles (FR)

(72) Inventors: Philippe Mazabraud, Orleans (FR); Elodie Chauvot, Ecuisses (FR); Laurent Delnaud, Ballan-Mire (FR); Katia Barral, Versailles (FR)

(73) Assignees: Commissariat a l'Energie Atomique, Paris (FR); L'Air Liquide, Societe Anonyme pour l'etude et l'exploitation des procedes Georges Claude, Paris (FR)

( * ) Notice: Subject to any disclaimer, the term of this patent is extended or adjusted under 35 U.S.C. 154(b) by 0 days.

(21) Appl. No.: 14/152,702

(22) Filed: Jan. 10, 2014

(65) Prior Publication Data

US 2014/0127431 A1    May 8, 2014

Related U.S. Application Data

(62) Division of application No. 12/094,440, filed as application No. PCT/EP2006/068816 on Nov. 23, 2006, now Pat. No. 8,658,756.

(30) Foreign Application Priority Data

Nov. 24, 2005   (FR) ...................... 05 53585

(51) Int. Cl.
*C08G 69/08*    (2006.01)
*C08G 69/14*    (2006.01)
(Continued)

(52) U.S. Cl.
CPC .............. *C08G 69/14* (2013.01); *B29C 41/003* (2013.01); *B29C 41/04* (2013.01); *C08G 69/20* (2013.01);
(Continued)

(58) Field of Classification Search
USPC ........................... 528/310, 314, 318, 323, 354
See application file for complete search history.

(56) References Cited

U.S. PATENT DOCUMENTS 3,017,391 A    1/1962  Mottus et al.
3,200,095 A    8/1965  Wichterle et al.
(Continued)

FOREIGN PATENT DOCUMENTS

CA         2 533 297        2/2005
EP    A-2002-069176        3/2002
(Continued)

OTHER PUBLICATIONS

Bruggerman Chemical web page, Nov. 2003.*
International Search Report completed Apr. 11, 2007, in International Application No. PCT/EP2006/068816, filed Nov. 23, 2006.
English language translation of the International Preliminary Report on Patentability from corresponding International Application No. PCT/EP2006/068816, filed Nov. 23, 2006.
"Trends in Barrier Design", May 1991, Packaging Japan.
"Next Generation Hydrogen Tankage", Laurence Livermore National Laboratory, Proceedings of the 2001 U.S. DOE Hydrogen Program Review.
"Hydrogen Composite Tank Program", QUANTUM Technologies WorldWide, Inc., Proceedings of the 2002 U.S. DOE Hydrogen Program Review.
(Continued)

*Primary Examiner* — Gregory Listvoyb
(74) *Attorney, Agent, or Firm* — Brinks Gilson & Lione

(57) ABSTRACT

The present invention relates to a composition that can be used to manufacture an impermeable, sealing, tight envelope, to a process for manufacturing an impermeable envelope, and to a tank. The composition of the invention comprises in % by weight relative to the total weight of the composition: from 70 to 90% of a monomer (I); from 0.1 to 1% of an activator (II), in which R is chosen from the group comprising $C_nH_{2n+2}$, n being an integer chosen from 1 to 10; —OH; —$OC_nH_{2n+2}$, n being an integer chosen from 1 to 10; and —NHR' where R' is either $C_nH_{2n+2}$, n being an integer chosen from 1 to 10, or an amine functional group; from 2 to 6% of a catalyst (III), in which X is chosen from the group comprising MgBr, MgI, Li and Na; and from 10 to 20% of an additive (IV), with:

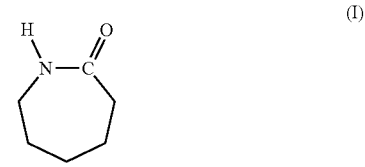

(I)

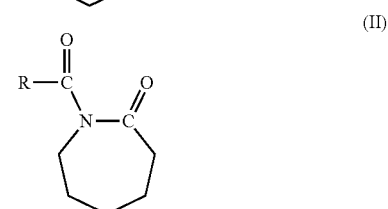

(II)

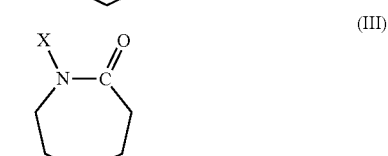

(III)

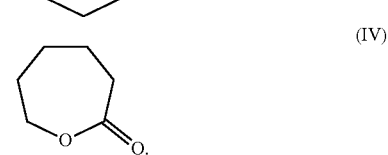

(IV)

This composition can be used, for example, to manufacture elements that are impermeable to fluids, for example impermeable envelopes, for example that can be used in the manufacture of type IV tanks or hydraulic accumulators.

3 Claims, 9 Drawing Sheets

(51) Int. Cl.
*B29C 41/00* (2006.01)
*B29C 41/04* (2006.01)
*C08G 69/20* (2006.01)
*C08L 77/02* (2006.01)
*H01M 8/00* (2006.01)
*H01M 8/10* (2006.01)
*B29C 39/08* (2006.01)
*C08K 5/1545* (2006.01)
*H01M 8/02* (2006.01)
*B29K 77/00* (2006.01)
*B29L 31/00* (2006.01)
*H01M 8/04* (2006.01)

(52) U.S. Cl.
CPC .................. *C08L 77/02* (2013.01); *H01M 8/00* (2013.01); *H01M 8/1002* (2013.01); *B29C 39/08* (2013.01); *C08K 5/1545* (2013.01); *H01M 8/0284* (2013.01); *B29K 2077/00* (2013.01); *B29L 2031/7156* (2013.01); *H01M 8/04014* (2013.01); *H01M 8/04089* (2013.01); *Y02E 60/521* (2013.01)
USPC ........... 528/310; 528/314; 528/318; 528/323; 528/326; 528/354

(56) References Cited

U.S. PATENT DOCUMENTS

| | | | |
|---|---|---|---|
| 3,275,733 A | | 9/1966 | Schule et al. |
| 3,417,097 A | | 12/1968 | Downing et al. |
| 3,780,157 A | | 12/1973 | Hechlhammer et al. |
| 3,923,925 A | * | 12/1975 | Schneider et al. ............ 525/408 |
| 4,925,044 A | | 5/1990 | Hembert |
| 4,927,038 A | | 5/1990 | Roebuck |
| 5,200,498 A | | 4/1993 | Udipi et al. |
| 5,499,739 A | | 3/1996 | Greist, III et al. |
| 5,538,680 A | | 7/1996 | Enders |
| 5,568,878 A | | 10/1996 | Le Breton |
| 5,577,630 A | | 11/1996 | Blair et al. |
| 5,902,643 A | | 5/1999 | Carlblom et al. |
| 6,171,423 B1 | | 1/2001 | Murphy et al. |
| 6,328,805 B1 | | 12/2001 | Rius |
| 6,418,962 B1 | | 7/2002 | Wozniak et al. |
| 6,554,939 B1 | | 4/2003 | Murphy |
| 6,660,214 B2 | | 12/2003 | LeBreton |
| 6,901,965 B2 | | 6/2005 | Baltes et al. |
| 6,946,176 B2 | | 9/2005 | Jousse et al. |
| 7,247,268 B2 | | 7/2007 | Jousse et al. |
| 2002/0188067 A1 | | 12/2002 | White et al. |
| 2003/0175457 A1 | | 9/2003 | Jousse et al. |
| 2007/0246475 A1 | | 10/2007 | Mazabraud et al. |

FOREIGN PATENT DOCUMENTS

| | | | |
|---|---|---|---|
| FR | 1 385 729 | | 1/1965 |
| FR | 1 519 947 | | 4/1968 |
| FR | 2 120 161 | | 8/1972 |
| FR | 2 813 232 | | 3/2002 |
| FR | 2 813 235 | | 3/2002 |
| FR | WO2005/123359 | * | 12/2005 |
| GB | 1 044 205 | | 9/1966 |
| GB | 1 098 093 | | 1/1968 |
| GB | 1 099 184 | | 1/1968 |
| GB | 1 349 324 | | 4/1974 |
| JP | 07 167392 | | 7/1995 |
| WO | WO 2005/123359 | | 12/2005 |

OTHER PUBLICATIONS

"Hydrogen Composite Tank Project", Quantum Fuel System Technologies Worldwide Inc., FY 2003 Progress Report.

"Development of a Compressed Hydrogen Gas Integrated Storage System (CH2-ISS) for Fuel Cell Vehicles", Johns Hopkins University Applied Physics Laboratory, FY 2003 Progress Report.

"Next Generation Hydrogen Storage", Laurence Livermore National Laboratory, FY 2003 Progress Report.

* cited by examiner

CAPROLACTAM-BASED COMPOSITION, PROCESS FOR MANUFACTURING AN IMPERMEABLE ELEMENT, AND TANK

This application is a Divisional application of U.S. Ser. No. 12/094,440, filed May 21, 2008, which is a National Stage application of International Application No. PCT/EP2006/068816 filed Nov. 23, 2006, the entire contents of which is hereby incorporated herein by reference. This application also claims the benefit under 35 U.S.C. §119 of French Patent Application No. 05 53585, filed Nov. 24, 2005, the entire contents of which is hereby incorporated herein by reference.

TECHNICAL FIELD

The present invention relates to a composition that can be used to manufacture an impermeable element (sealing element) made of polycaprolactam or polyamide PA-6, for example to manufacture envelopes that are impermeable, tight, (sealing envelope) to fluids, in particular to pressurized gases.

The present invention also relates to a process for manufacturing an impermeable, tight, envelope (sealing envelope) and to a tank, reservoir capable of being obtained (obtainable) by this process.

The impermeable, tight, sealing envelopes of the present invention may be used, for example, for manufacturing type IV tanks or hydraulic accumulators. Composite type IV tanks are tanks in which the pressure of the gases stored is generally from $10^6$ to $10^8$ Pa. Their structure is therefore designed, on the one hand, to be impermeable to the gases stored and, on the other hand, to withstand the storage pressures of these gases: it comprises an inner envelope or bladder that is impermeable to the gas, also known as a liner, and an outer reinforcing structure usually composed of carbon fibres and thermosetting resin.

The present invention finds, for example, applications in the manufacture of low-temperature fuel cells (for example, proton exchange membrane fuel cells or PEMFCs).

In the description below, the references between brackets ([ ]) refer to the list of references given after the examples.

STATE OF THE ART

Type IV tanks were developed in the 1990s, first for storing natural gas with polyethylene liners and, more recently, mainly from 1997 onwards, for storing hydrogen.

The thermoplastic liners currently used are for the most part composed of polyethylenes (PEs) which are usually of high density (HDPEs) and sometimes crosslinked (XHDPEs). Other thermoplastics of polyamide (PA) type (usually known as "nylon"™) of PA-6, PA-12 or PA-11 type are also used as they have gas barrier properties that are intrinsically better than polyethylene. Finally, other types of more technical thermoplastics may be used because they have good gas barrier properties, such as polyvinyldene difluoride (PVDF) or multilayer solutions with a barrier layer made of an ethylene/vinyl alcohol copolymer (EVOH). Documents [1] and [2] describe such thermoplastics.

Most of the time, these liners are obtained by rotomoulding or extrusion and/or blow moulding of the thermoplastic in the melt state. Thus, in document [3], it is mentioned that the thermoplastic liner is obtained by extrusion-blow moulding or rotomoulding, preferably using a high or medium density polyethylene. In document [4], impermeable liners made of polyethylene, polypropylene or polyamide are obtained by rotomoulding. In document [5], it is specified that the nylon-11 liner is produced by rotomoulding. In document [6], it is mentioned that the liner is obtained from a thermoplastic which is extruded, blow moulded or rotomoulded. In documents [7] and [8], it is mentioned that the thermoplastic liner may be moulded by extrusion, blow moulding or by rotomoulding.

Injection moulding is rarely used due to technical limitations and press and mould cost reasons. This is because the impermeable liners can have an internal volume of up to 150 liters, with thicknesses of several centimeters. Thermoforming is rarely used, although it is technically possible to use this technology to produce such impermeable liners.

The current technology of rotomoulding of molten thermoplastics has a particular advantage. This is because it makes it possible:

- to be able to manufacture large-size parts, ranging up to 150 liters, or even beyond;
- to be able to insert one or more socket(s) (connecting pipe that makes it possible to fill the liner with gas and to empty it) and this being without bonding operations subsequent to processing;
- to provide thick and homogeneous impermeable liners.

The website [9] of the Association Francaise de Rotomoulage [French Rotomoulding Association] (AFR) describes a rotomoulding protocol via melting of a thermoplastic.

In all these processes, the thermoplastic is melted in order to be shaped to the desired liner geometry, then it must be cooled before being demoulded. Numerous defects of the liner result from this melting, especially the formation of networks, unmelted material or microporosities, and oxidation of the thermoplastic. These defects impair the final sealing performance of the liner, and therefore the performance of the tank. Furthermore, in the case of rotomoulding, even if bonding of the socket to the liner is not necessary, the sealing between the socket and the liner is not always satisfactory, due to the fluidity of the molten thermoplastic which is insufficient to closely match the forms of the socket. Moreover, this fluidity of the molten material cannot be increased by raising the temperature without causing a chemical impairment of said material. In addition, the processes used take a lot of time, which is further prolonged by the cooling time of the material after moulding the liner, especially due to the inertia of the mould.

Polyamide 6 (PA-6) is the thermoplastic which appears the most advantageous for the manufacture of impermeable liners, considering the compromise between its barrier properties to gases, especially hydrogen, and its mechanical properties over a wide temperature range extending from −40° C. to +100° C. Unfortunately, PA-6 is poorly suited to rotomoulding because, as in other techniques for moulding thermoplastics, it needs to be melted at a temperature above 223° C. in order to give it the desired shape. The cooling time of the polymer is then relatively long. In addition, this melting leads to the defects identified above which impair the final performance of the tank. The development of thermoplastics, for example of PA-6, having grades more suitable for rotomoulding, that is to say having a low water content of the powders, a lower viscosity, a suitable molecular weight, suitable antioxidants, etc., does not make it possible to solve all these defects. Furthermore, the development of the technology of rotomoulding machines, for example rotomoulding under nitrogen, controlled cooling, reduction of the cycle time, does not make it possible to solve all these defects either. This is because, for example, since melting of the PA-6 begins from around 220° C., this melting step is chemically degrading as the molten PA-6 must remain above its, melting point for 5 to 15 minutes with process temperatures that exceed, sometimes by 40° C., the melting point.

Documents [10] to [15] show the current state of the art, the developments in progress, and especially the thermoplastics and their mode of implementation for developing type IV tanks, for a fuel cell application.

But none of these documents mention an element or envelope that is impermeable to pressurized fluids, for example at a pressure of $10^7$ to $10^8$ Pa, nor their manufacture. In addition, the compositions described in these documents do not make it possible to obtain impermeable elements or an impermeable envelope having sufficient mechanical properties and barrier properties to pressurized gases, for example for manufacturing a type IV tank.

There are mainly two types of polymerization for obtaining polyamide 6: hydrolytic polymerization and anionic polymerization. Hydrolytic polymerization cannot be used in reactive rotomoulding.

Documents [16], [17] and [28] to [32] describe caprolactam compositions that make it possible to manufacture objects moulded from polyamides or copolyamides by anionic polymerization in a rotating mould: the polymer is formed by in situ polymerization, in the rotating mould. This is therefore referred to as reactive rotomoulding.

However, the caprolactam compositions described in these documents do not provide a truly satisfactory solution to the numerous aforementioned problems. In addition, it is necessary to add nucleating agents (silica-type fillers, for example microtalc), plasticizers (for example, phthalates) or elastomeric units (for obtaining alloys), in order to improve the mechanical properties and/or gas barrier properties. These additions increase the time and the cost of manufacturing the envelope. Furthermore, the mixtures are complex to produce and their homogeneity is difficult to obtain.

There is therefore a real need for a composition that overcomes these defects, drawbacks and obstacles of the prior art, in particular for a composition that makes it possible to control the manufacturing time, reduce the costs and improve the gas barrier properties, especially the barrier properties to hydrogen, and the mechanical properties, especially low-temperature elastic deformation, of the envelopes manufactured, and that makes it possible to obtain envelopes that are compatible for use as an impermeable liner for a type IV tank.

This composition must enable, for example, the manufacture of a tank envelope or liner for a low-temperature fuel cell (PEMFC) for which the storage of the hydrogen, carried out at pressures ranging from $3.5 \times 10^7$ Pa to $7 \times 10^7$ Pa, or even $10^8$ Pa, requires tanks that are light, safe and inexpensive, especially for onboard storage (transport).

DESCRIPTION OF THE INVENTION

The present invention specifically provides a composition that overcomes the defects, drawbacks and obstacles of the prior art.

The composition of the present invention comprises in % by weight relative to the total weight of the composition:
from 70 to 90% of an ε-caprolactam monomer of formula (I);
from 0.1 to 1% of an ε-caprolactam activator of formula (II), in which R is chosen from the group comprising $C_nH_{2n+2}$, n being an integer chosen from 1 to 10, preferably from 1 to 6; —OH; —$OC_nH_{2n+2}$, n being an integer chosen from 1 to 10, preferably from 1 to 6; and —NHR' where R' is either $C_nH_{2n+2}$, n being an integer chosen from 1 to 10, preferably from 1 to 6, or an amine functional group;
from 2 to 6% of an ε-caprolactam catalyst of formula (III), in which X is chosen from the group comprising MgBr, MgI, Li and Na; and
from 10 to 20% of an ε-caprolactone additive of formula (IV);
in which the formulae (I), (II), (III) and (IV) are the following:

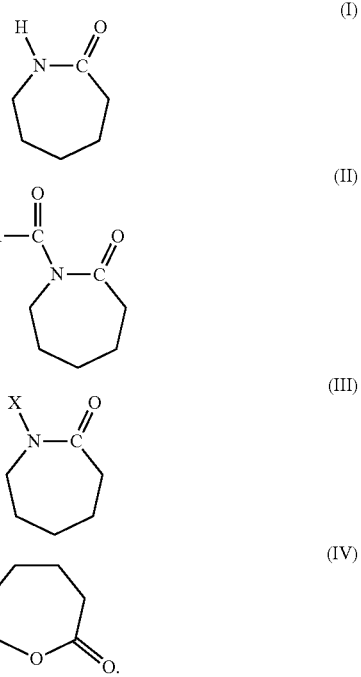

By way of example, a composition comprising 80.6% of said ε-caprolactam monomer, 0.4% of said ε-caprolactam activator, 4% of said ε-caprolactam catalyst and 15% of said ε-caprolactone additive has given excellent results during numerous experimental trials carried out by the inventors.

The composition of the present invention makes it possible to obtain PA-6 polyamides by anionic polymerization of the .epsilon.-caprolactam monomer, added to which are an ε-caprolactam catalyst, for example of bromomagnesium lactamate type, an ε-caprolactam activator, for example of acyl caprolactam type, and an ε-caprolactone additive, each being used in a very precise range in terms of % by weight. This novel composition makes it possible to obtain a PA-6 polyamide, of which the barrier properties to gases, especially to hydrogen, and the mechanical properties, especially low-temperature elastic deformation, are improved relative to the compositions of the prior art and, a fortiori, are compatible with an improved use as an impermeable liner for type IV tanks.

These mechanical and/or gas barrier properties are improved without adding nucleating agents, plasticizers or elastomer units. This results in a not inconsiderable saving in time and cost in the manufacture of impermeable elements such as impermeable envelopes or liners. Moreover, considering the nature of the components of the composition of the present invention, the homogenization of the mixture is facilitated.

The ε-caprolactam monomer of the composition of the invention is a common caprolactam also known as 2-oxohexamethyleneimine. Preferably, a pure or practically pure product is used. It may be, for example, AP CAPROLACTAME™ manufactured by DSM Fibre Intermediate, which is a 99.9% pure product.

The ε-caprolactam catalyst of the composition of the invention is such as defined above, preferably a bromomagnesium lactamate. The activator is such as defined above, preferably an acyl caprolactam. These components have been chosen by the inventors of the present invention as they allow a reaction that is gradual and controlled over a short time. This is because the viscosity of the mixture reaches its maximum (solid material) at around 1 to 3 minutes (depending on the proportions) after the initiation of the reaction, which leaves time for the material to be distributed over the walls of the rotomoulding mould. For information purposes, the ε-caprolactam activator, for example such as defined above, may be in the liquid state at ambient temperature, whereas the ε-caprolactam monomer and the ε-caprolactam catalyst (mixed with caprolactam) may be in the form of flakes which melt at around 70° C.

The catalyst used may be, for example, a mixture of bromo (hexahydro-2H-azepin-2-onato-N)magnesium (for example, from 10 to 50% by weight) and ε-caprolactam (for example, 50 to 90% by weight), sold by Bruggemann Chemical under the trade name NYRIM C1 CATALYST. The activator used may be, for example, N-acteyl-hexanelactam, sold by Bruggemann Chemical under the trade name AKTIVATOR 0. The ε-caprolactone additive used may be, for example, NYRIM ADDITIVE 6™ sold by DSM Rim Nylon VOF.

In fact, it is the ε-caprolactone additive which makes it possible to replace the addition of nucleating agents, plasticizers or elastomer units while retaining, or even improving, the mechanical and/or gas barrier properties of the polymer obtained. This organic molecule directly participates in the polymerization reaction and is inserted in the macromolecular chain in order to give it a greater "flexibility". The composition of the present invention makes it possible, in practice, to form a random copolymer. This additive makes it possible to astutely increase the ductility of the PA-6 obtained without disturbing its processing and its barrier properties.

The composition of the present invention may be used in the manufacture of an impermeable, tight, sealing element. The impermeable, tight, sealing element of the present invention has the ability to confine a fluid, for example in a device, in a pipe or in a tank, that is to say to prevent any exit of the fluid, whether under the effect or not of a pressure applied to the fluid in contact with the impermeable element, during the entire operating life of the device, of the pipe or of the tank.

The term "fluid" is understood in the present description to mean a liquid or a gas or else a gas/liquid mixture. In each case, it may be a pure liquid or a pure gas or a mixture of several liquids or several gases. For example, in the case of a hydraulic or hydropneumatic accumulator, two fluids may be confined, for example an inert gas and a liquid, for example nitrogen and mineral oil.

The term "element" is understood in the present description to mean any structure that makes it possible to ensure sealing. It may be, for example, a sealing joint; an impermeable, sealing, tight liner that may or may not be self-supported; an impermeable, tight, sealing coating; an impermeable tight, sealing envelope; an internal or external impermeable, tight, sealing envelope of a tank; an impermeable, tight, sealing flask or canister; etc.

The present invention finds an advantageous application in the confinement of pressurized fluids. In this case, the impermeable element is an envelope that is impermeable, tight to pressurized fluids.

The use of the composition of the present invention is not limited to one particular process that makes it possible to obtain the impermeable element. This is because the improved properties of the polymer obtained due to the composition of the present invention are inherent to said composition. However, the composition of the present invention has a certain advantage for producing an impermeable envelope by rotomoulding. It is possible to use, for example, the composition of the present invention for manufacturing, by rotomoulding, a gas-impermeable envelope for a composite type IV tank. One procedure that makes it possible to produce such a tank is explained below.

Thus, the present invention also provides a process for manufacturing an impermeable envelope, said process comprising the following steps:
(a) preparation of a composition according to the invention and its introduction into a rotomould;
(b) rotation of the rotomould and polymerization of the ε-caprolactam monomer of said composition to polycaprolactam, said composition being heated to a polymerization temperature greater than or equal to the melting point of the ε-caprolactam and less than the melting point of said polycaprolactam, so as to form said envelope by rotomoulding coupled with a polymerization without melting of the polycaprolactam obtained;
(c) crystallization of the polycaprolactam obtained; and (d) demoulding of the polycaprolactam liner obtained.

The polymer is formed at the same time as it takes up the shape of the rotomould. Therefore, it is referred to as reactive rotomoulding since, strictly speaking, the rotomould is used both as a chemical reactor and as a mould that gives the shape of the liner. This reactive rotomoulding is particularly economical, fast and versatile. It leads to the production of materials that are more flexible than those of the prior art (rotomoulding by melting) and that have improved barrier properties, especially to gases.

The anionic polymerization reaction of the caprolactam monomer is an entirely conventional chemical reaction which makes it possible to polymerize a precursor monomer of a thermoplastic polymer to said thermoplastic polymer. However, the development, of the "reaction path" of the present invention has required numerous research studies relating to the formulation of the composition of the present invention, in order to choose the activators, catalysts and additives that are most suitable in terms of the process (polymerization/moulding competition) and final desired properties. Numerous research studies have also been necessary regarding the optimization of the rotomoulding procedures in order to introduce the liquid components or their mixture and to control the anionic polymerization in the rotating mould.

Any method of preparing the composition of the present invention from each of its components is suitable, provided that the concentration of each of the components is such as defined in the present invention. Preferably, a preparation method will, of course, be chosen that prevents the polymerization from being triggered before introduction of the mixture into the rotomould. The appended FIGS. 16A, 16B and 16C present examples of the preparation of the composition of the present invention. Thus, for example, in step (a) it is possible to prepare two premixes of said composition, one containing the monomer, the activator and the additive, and the other the monomer and the catalyst, these two premixes being mixed together just before, during or after their introduction into the rotomould to form said composition. The appended FIGS. 16A and 16C illustrate examples of preparations of premixes. Thus, the two premixes can be prepared and stored (preferably, under a neutral and dry gas) separately several hours or even several days before the manufacture of the envelope and mixed together at the moment of the implementation of the present invention. Also, for example it is possible to simultaneously introduce the four components of the composition of the present invention into the mould (FIG. 16B).

Advantageously, according to the invention, in step (a), the composition or the premixes is/are additionally preheated to a preheating temperature greater than or equal to the melting point of said monomer and less than said polymerization temperature, before or after the introduction step (b) so as to melt the composition and homogenize it. The .epsilon.-caprolactam is liquid from 70° C. at atmospheric pressure. FIGS. 16A to 16C present this embodiment in various mixture and premix configurations. When one of the other components of the composition has a melting point above the melting point of the monomer, the mixture or the premixes is or are preferably preheated at least to said melting point.

The premixes or mixture may be produced, for example, in a mixer for caprolactam. In the case of the premixes, this mixer may be composed, for example, of two stainless steel chambers introduced into which are, on one side, a caprolactam+catalyst mixture and, on the other side, a caprolactam+activator+additive mixture. These two premixes may then be homogenized at the same temperature, typically from 100 to 150° C., for example from 110 to 135° C., and stirred (preferably under an inert and dry gas) via an internal mechanical system. Each chamber is advantageously equipped with a metering piston that makes it possible to inject a precise amount of each premix into the rotomould. The contact between the two premixes may take place outside of the mixer, for example using a nozzle that then makes it possible to inject the mixture obtained into the rotomould.

According to the invention, preferably, in step (a), at least the ϵ-caprolactam monomer and the ϵ-caprolactam catalyst of said composition are purged, just after weighing the bags and pots of these components, using an inert, preferably dry, gas due to their high sensitivity to moisture. More preferably, the other components of the composition of the present invention are also purged. Preferably, the rotomould is also purged using an inert dry gas during the implementation of step (c). The inert gas may be, for example, dry nitrogen. The inert gas is most preferably dry, so that the polymerization reaction is carried out in an anhydrous medium, in order to prevent the oxidation and uptake of water of the ϵ-caprolactam components before the polymerization. In this case, the aforementioned mixer may advantageously be equipped with a system for sparging, for example with dry nitrogen.

The polymerization is initiated, at the polymerization temperature, as soon as the composition is formed, that is to say as soon as all the components of the composition of the present invention are mixed together. It is therefore important not to waste time, at the risk of seeing the mixture polymerize before its injection into the mould. The vent through which the liquid mixture or the premixes are injected into the rotomould may advantageously be modified in the shape of a funnel to facilitate the introduction of the mixture or of the premixes. Advantageously, the injection of the two premixes may be carried out automatically using a low-pressure injector or a high-pressure injector, for example having a scraper piston.

The amount of composition according to the invention introduced into the rotomould determines, as a function of the size of the mould, the thickness of the wall of the envelope manufactured according to the process of the present invention. The choice of this thickness is mainly made:

- as a function of the desired barrier performance to the stored gas, for example to hydrogen, of the polycaprolactam (for hydrogen, drafts of standards ISO TC 197 and EIHP II which allow a leakage of 1 $cm^3$/liter of tank/hour);
- as a function of the mechanical performance of the thermoplastic, for example of sufficient resistance to the installation of a mechanical reinforcement outside of the envelope (liner), for example by winding of carbon fibres (the envelope then serving as a mandrel) during the manufacture of a tank; and
- as a function of the mechanical performance of the thermoplastic, for example a sufficient ductility in order not to present fatigue during numerous filling operations of the tank (greater than or equal to 1500 cycles between −40 and +85° C.).

According to the invention, the envelope generally has a wall thickness defined so as to be able to withstand the leakage of the gas at the pressure at which it must be stored, known as the operating pressure, normally between $10^7$ and $10^8$ Pa (between 100 and 1000 bar). The present invention of course applies to pressures other than these, generally from $10^5$ to $10^8$ Pa, the thickness of the envelope being chosen, in particular, as a function of this operating pressure and the nature of the gas. In general, the thickness of the envelope is between 1 mm and 60 mm, for example between 1 mm and 20 mm, for example between 2 and 10 mm.

In the process of the invention, the polymerization is carried out in a rotating mould or rotomould. For this, it is possible to use a conventional rotomoulding machine, for example such as those described in the aforementioned documents relating to the rotomoulding of a molten thermoplastic. Preferably, the mould of the rotomoulding machine is sufficiently impermeable to the liquids, in particular to the composition of the invention minus its additive, since it then has a viscosity less than that of water. The rotomould may advantageously be equipped with one or more vents and an inlet for a neutral gas in order to be purged using a dry inert gas for and/or during the implementation of the polymerization step (c) as explained above.

According to the invention, the rotomould is preferably rotated about two axes (biaxial rotation), so that the polymerization takes place over the entire internal surface of the mould provided to form the envelope and conforming to this surface.

When rotomoulding molten material according to the prior art, the rotational speeds of the primary axis and of the secondary axis are between 1 and 20 rpm (rpm: revolutions per minute), usually between 2 and 10 rpm. In the process of the present invention, the rotational speeds (primary axis speed, secondary axis rotational speed and ratio of the speeds) are of the same order of magnitude, although the fluidity of the monomer is greater than that of the molten material. Thus, according to the invention, the rotational speed of the mould is preferably from 1 to 30 rpm, more preferably from 2 to 25 rpm (revolutions per minute), about the primary and secondary axis. The ratio of the speeds (secondary axis speed/primary axis speed) is preferably equal to 7.5. These preferred rotational speeds gave very good results with the composition of the present invention.

According to one variant of the present invention, the rotomoulding may be carried out in a rock and roll rotomoulding machine. The rotomould is in this case driven by a rotational movement about the longitudinal axis of the mould and by a rocking movement via which the two ends of the mould are alternatively found at the top and at the bottom. Document [36] describes such a machine that can be used to carry out the process of the invention, and its use. Such rotomoulding may be useful, for example, for manufacturing large-size and/or elongated tanks. The compositions and temperatures used are those of the present invention.

According to the invention, the polymerization is carried out at a temperature such that the envelope is formed without there being melting of said polycaprolactam formed. This is because, if the melting point of the polymer formed is reached or exceeded during the polymerization of the monomer, this leads to the aforementioned defects of the liners of the prior art obtained by rotomoulding of molten material. According to the invention, the step that consists in polymerizing the ε-caprolactam monomer to polycaprolactam or polyamide 6 (PA-6) in the rotating mould is therefore carried out, most preferably, at a polymerization temperature of 150 to 200° C., preferably from 160 to 180° C.

For the same reasons as those explained above for heating of the premixes and/or of the composition before introduction into the mould, preferably, according to the invention the rotomould may be heated to a temperature of 100 to 200° C., preferably 130 to 185° C., before introduction of the composition of the invention. The mould may be heated, for example, using an oven into which the mould is introduced. When the mould has reached a temperature of 100 to 200° C., preferably 130 to 185° C., the mould may be removed from the oven in order to introduce the composition of the present invention thereto. It is optionally possible to do without the oven by using, for example, infrared (IR) lamps, or a mould with integrated heating, for example via infrared lamps or heat bands, or a double-walled mould with circulation of a heat transfer fluid.

In one advantageous embodiment, in particular for producing a thick impermeable envelope according to the invention, it is possible to repeat the steps (a)+(b)+(c). This makes it possible to form an impermeable envelope having several layers of polycaprolactam(s) that are identical or different, in thickness and/or in composition. Thus, starting from the same composition or starting from different compositions it is possible to carry out several successive polymerizations and obtain a multilayer envelope according to the invention. The compositions may be different in the concentration of each of the components and/or in the nature of the components of the composition, within the context of the definition of the composition of the present invention.

For example, in order to obtain envelope wall thicknesses greater than 3-4 mm, advantageously several successive polymerization steps may be carried out until the desired thickness is reached. For example, it is easy to make a polycaprolactam thickness of 6 mm in a single layer owing to the present invention, but to obtain a certain homogeneity in thickness, a thickness of 2 to 3 mm is preferable. Thus, for an envelope wall thickness of 6 mm or more, it is preferable to make, for example, several successive 3-mm layers of polycaprolactam.

Advantageously, since the polymerization reaction is exothermic, it is not always necessary to put the rotomould back in the oven in order to polymerize each layer once the polymerization of the first layer has started. This is because the polymerization of a first layer may be enough to maintain a sufficient temperature for the anionic polymerization of the following layer.

The polymerization reaction time depends, in particular, on the nature of the activator and of the catalyst, on their proportions, on the processing temperature and on the size of the part to be manufactured. One of the many advantages linked to the composition of the present invention is that the polymerization reaction is very rapid, in general from 2 to 10 minutes, often around 1 to 5 minutes. The preferred compositions of the present invention make it possible to obtain, from the injection step to the crystallization step, the final polymer in around 2 to 10 minutes, preferably in around 10 minutes. The complete polymerization reaction in fact takes place in four phases:

Mixing of the reactants: the viscosity is stable and low, the components of the mixture have not yet reacted.

Polymerization: the monomers assemble to form polyamide macromolecules which leads to an increase in the viscosity. The macromolecules (polymers) are initiated starting from active centres (activators) onto which the caprolactam monomers are grafted. Thus, the molecular weight of the polyamide PA-6 obtained depends directly on the percentage of activator in the reactive mixture. The reaction rate is itself a function, in particular, of the proportion of catalyst. It is during this phase that the homogenization of the part is critical.

Crystallization: the macromolecules reassemble to form semicrystalline structures, this is the germination, followed by the growth, of spherulites. The appearance of ordered zones in the viscous medium renders the latter cloudy (light scattering).

Shrinkage, identified by a detachment between the material and the mould. The shrinkage marks the end of the crystallization.

The chemical equation for the polymerization is shown schematically below. In the formulae of this scheme, the bonds between the C and N atoms are covalent bonds. They are represented by dotted lines to indicate that they preferably open during the polymerization. "p" is the degree of polymerization of the polyamide PA-6. This degree of polymerization may be $1 \leq p \leq 100\,000$.

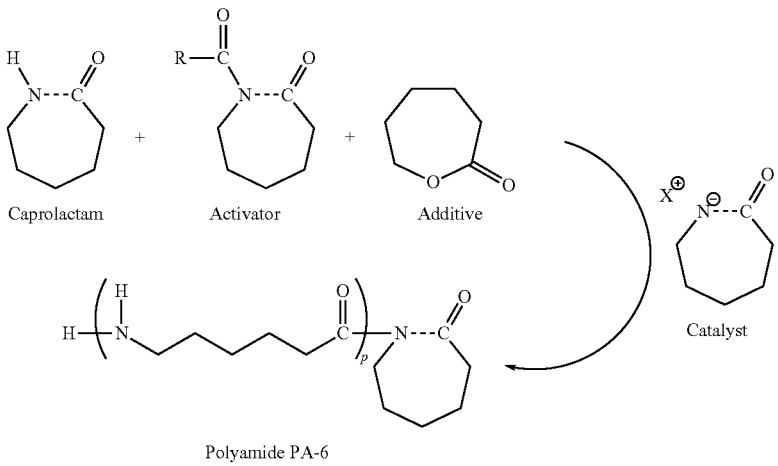

Polyamide PA-6

When the polymerization is finished, in particular when the length of the chains is sufficient and the crystallization is completed (organization of the polymer chains), it is optionally possible to cool the mould for a few minutes, in particular to facilitate the handling of the envelope manufactured, in order to prevent any risk of burns. The envelope is then demoulded. This results in an obvious time saving compared to the processes of the prior art, especially considering the inertia of the mould, where the temperature of molten rotomoulding of the prior art was much higher than that used in the process of the present invention, and where it was necessary to wait for the material to change from the melt state to the solid state.

The process of the invention allows the manufacture of a polycaprolactam impermeable envelope that is capable of being incorporated into the manufacture of any composite tank intended for the storage of fluids (liquids or gases or liquid+gas mixtures), in particular pressurized gases. The impermeable envelopes manufactured by the process of the invention have higher performances in turns of mechanical and gas barrier properties than those of the prior art, especially since there is no longer a risk of chain scission, of oxidation, of crosslinking, of polycondensation, of final porosity, of residual stresses or inhomogeneity, etc., that are inherent to the melting and solidification phenomena of thermoplastic polymers.

In addition, as shown by the experimental results explained in the examples below, the interior surface condition of these envelopes is much better than that of liners obtained by a molten material process of the prior art or with polymerization compositions of the prior art. These improved properties are obviously reflected in all the properties of the tanks that are manufactured from these envelopes.

According to the invention, the envelope obtained may additionally be subjected to one or more post-treatment(s) intended to coat its inner or outer surface with one or more thin film(s) in order to further improve the sealing properties of the liner to the gas which will be stored therein (barrier properties) and/or to give it particular chemical properties, for example resistance to chemical attack, a food grade quality or a better ageing resistance. This post-treatment may consist of a deposition treatment of $SiO_x$ type, where $0 \leq x \leq 2$, or else of $Si_yN_zC_t$ type, where $1 \leq y \leq 3$, $0.2 \leq z \leq 4$ and $0 \leq t \leq 3$, via plasma-enhanced chemical vapour deposition (PECVD), of aluminium via a physical vapour deposition (PVD), deposition of epoxy type by chemical crosslinking, or fluorination with $CF_4$, for example. Documents [21] and [22] describe this type of post-treatment that is well known to a person skilled in the art in the manufacture of type IV tank liners, and that can be used on the liner obtained by the process of the present invention.

According to the invention, it is possible to attach at least one tank socket to the inside of the rotomould before carrying out step (c) so that the tank socket is incorporated into the impermeable envelope during the polymerization. This makes it possible, in particular, to manufacture a tank with or starting from said envelope (for example, an impermeable liner). When the envelope manufactured is small (for example, for a small tank) a single socket may be sufficient. For a large-size envelope (for example, for a large-size tank), it is preferred to install two sockets, in particular to allow rapid filling and emptying of the tank. The socket (or the sockets) may be installed at one end (at both ends) of the envelope, in particular when it has an elongated shape, but also on the length of the envelope, somewhere between the ends.

According to the invention, said at least one metal socket provides the interior/exterior connection of the tank for its filling and for the use of the stored gas. The socket may be a socket conventionally used for this type of tank, for example an aluminium or steel socket. One or more socket(s) may be positioned in the mould to obtain one or more sockets on the manufactured envelope. The socket or sockets may be subjected to a treatment intended to further improve the sealing of the socket/envelope join. It may be, for example, a chemical treatment consisting in depositing, on the socket, a specific or silane epoxy resin in order to improve the chemical attachment of the PA-6 obtained via the polymerization in the process of the invention. This treatment may be, for example, a treatment such as that described in document [4]. According to the invention, prior to this deposition of resin, the socket may be sandblasted or undergo an acid treatment in order to further improve the adhesion of the resin and therefore of the envelope on the socket.

The inclusion of one or more socket(s) on the envelope may be carried out according to the conventional processes well known to a person skilled in the art, for example according to the processes described in documents [4] and [23], or in one of the aforementioned documents where at least one socket is provided. However, in the present invention the thermoplastic polymer is not melted in order to be joined to the socket; it is formed by polymerization of the monomer simultaneously in the mould and on the socket or sockets positioned in the mould before rotomoulding according to the process of the present invention. The socket or sockets may be positioned, for example, in the manner described in document [23].

The envelope obtained according to the process of the invention, equipped with the socket or sockets, is then demoulded. Due to the process of the present invention, the risk of leakage at the sockets is greatly reduced, as during the rotomoulding the viscosity of the monomer at the start of the polymerization is very low and it very readily spreads into the interstices and/or attachment points of the socket.

The present invention also relates to a composite tank storing a fluid, said tank comprising an impermeable envelope capable of being obtained by carrying out the process of the invention.

The fluid may be such as defined above, for example a pressurized gas. The present invention finds an application for storing any pressurized or unpressurized fluid, for example gaseous hydrogen, helium, natural gas, compressed air, nitrogen, argon, hytane, etc.

For example, said tank may comprise, in this order, from the inside of the tank to the outside of the latter, at least: [0082] said impermeable envelope (2); [0083] at least one metal socket (4); and [0084] an outer mechanical reinforcement (6) for the envelope.

The envelope may be such as defined above. In this type of tank, it is usually known as a "liner".

The socket or sockets may be such as defined above. When there are several sockets, they may be identical or different.

According to the invention, the outer mechanical reinforcement of the envelope provides the mechanical strength of the tank. It may be any one of the reinforcements known to a person skilled in the art commonly positioned around the envelopes of tanks, for example of type III or IV. It may be, for example, a filament winding. This filament winding may be composed, for example, of carbon fibres and thermosetting resin. For example, the carbon fibre, previously impregnated with uncrossed epoxy resin, may be wound around the envelope held by the socket or sockets, for example according to one of the processes described in documents [4], [5], [24] or [25]. The envelope, which in the particular example of a type IV tank, is a self-supported structure, in fact serves as a mandrel for this filament winding. A type IV tank may thus be obtained.

The envelope manufactured according to the invention therefore makes it possible to obtain a composite type IV tank, the mechanical and barrier performances of which are much greater than those of one and the same tank whose liner (made from the same thermoplastic) is manufactured by extrusion-blow moulding, thermoforming, injection moulding or rotomoulding of the molten thermoplastic or of a polymerization composition of the prior art.

The present invention is particularly suitable for the manufacture of a tank that supplies fuel cells, in particular low-temperature fuel cells, for which the mechanical requirements are very strict, and high-temperature fuel cells, for which the sealing requirements are also very strict. The fact of using compressed $H_2$ tanks for PEMFCs, especially for transport applications (for example, car, bus, etc.) necessitates having sufficient autonomy, that is to say loading as much H.sub.2 as possible, which is carried out by increasing the operating pressure of the tank up to $7 \times 10^7$ Pa (700 bar) and even higher. Furthermore, for transport applications, the tanks must preferably be light, which implies the use of composite type III or IV tanks.

Due to the composition of the present invention and to the process of the present invention, the envelope may have a thickness such that it withstands a tank operating pressure between $10^7$ and $10^8$ Pa (between 100 and 1000 bar). The composition of the present invention may therefore advantageously be used for manufacturing a type III or IV tank, for example such as those mentioned previously.

The composition of the present invention and the process for manufacturing the envelope also make it possible to manufacture an impermeable envelope that can be used for manufacturing hydraulic or hydropneumatic accumulators. This is because such an envelope advantageously withstands variable pressures which may range from atmospheric pressure ($10^5$ Pa) to $10^8$ Pa.

Hydraulic or hydropneumatic accumulators and their uses are known to a person skilled in the art. One of the main functions of these accumulators is to store energy transmitted by a liquid in the form of volume and pressure and to restore it automatically or on demand. Their function may be one or more of the following functions: to accumulate energy and distribute this energy at a desired power, so as to make it possible to reduce an installed power; to absorb pressure pulsations produced by a pump; to compensate for leaks by forming a pressure reserve; to absorb variations in volume of a liquid, especially caused by temperature differences in a liquid circuit and to constantly keep the circuit pressurized; to fully transmit pressures from one fluid to another without risk of mixing.

A description of such accumulators and of their uses is presented, for example, in Techniques de l'Ingénieur, A767, "Appareillage de controle des fluides dans les tuyauteries" [Equipment for the control of fluids in duct work], by Jean Sutter, or else on the Internet sites referenced [34] and [35] in the appended list of references. They generally comprise an outer body that provides the mechanical strength and sealing of the accumulator, a flexible internal pocket which may contain, in an impermeable manner, a generally neutral gas (for example, nitrogen). The pocket is not bonded to said body and forms a space that allows a fluid to be introduced around this pocket. The accumulator also comprises a first connector that makes it possible to fill or empty said internal pocket with said gas, and a second connector used to introduce a fluid between said pocket and the body of the accumulator during its use. The storage of the energy stored in the accumulator is carried out by compressing the gas contained in the flexible inner pocket via introduction of the fluid through the second connector. The pocket makes it possible to isolate the gas that it contains from the fluid that surrounds it, in order to avoid any dissolution or entrainment of the gas in the fluid, that is to say a reduction in the amount of gas present in the inner pocket of the accumulator, a drop in the inflation pressure, and an increase in the compressibility of the fluid, that leads to a disruption in the operation of the accumulator and of the device which uses this accumulator.

In the accumulators of the prior art, the body is formed from a metal (carbon steel or stainless steel) or plastic (polyvinyl chloride, polypropylene or polyvinyldiene fluoride) shell with metallic reinforcement depending on the use (field, usage pressure, etc.). The inner pocket is made from one and the same part. This pocket is generally formed from nitrile rubber (NBR); it may also be formed from a material chosen from isobutene-isoprene rubber (IIR), epichlorohydrin rubber, ethylene propylene rubber, natural rubber, the elastomer for food usage, the nitrile for hydrocarbons, etc. The fluid surrounding the envelope is generally chosen from water, mineral oil, or gas (for example nitrogen or another neutral gas).

The accumulators of the present invention differ from those of the prior art, for example from those described in the aforementioned document and Internet sites, in that, in the present invention, the body of these accumulators from the prior art is replaced by the impermeable envelope of the present invention, equipped or not with an outer mechanical reinforcement such as defined above for type IV tanks (for example, a filament winding). The mechanical reinforcement will be used, for example, when the usage pressures of the accumulator require it.

In other words, the accumulator of the present invention may be, for example, in the form of a type IV tank according to the present invention, this tank being additionally equipped with a flexible inner pocket and the aforementioned connector. The connector, the flexible pocket, the gas in the pocket and the fluid around the pocket may be chosen from those known to a person skilled in the art, for example from those cited in the aforementioned document and Internet sites. These elements may be, for example, such as those cited above.

More generally, the composition of the present invention and the implementation process via rotomoulding may be used for various applications such as: [0097] impermeable liner for a type IV tank; [0098] inner coating for an insufficiently impermeable liner of a type IV tank (provision of the gas-barrier property); [0099] inner coating for a metal liner, for example made of aluminium or of steel, for a type III tank (provision of the gas barrier property to limit the effects of embrittlement or of the water-barrier property to limit the effects of corrosion); and [0100] inner coating for a type I or type II tank; etc.

Thus, the specific formulations of the composition of the present invention processed by rotational moulding may be used each time that a barrier property (liquid or gas or liquid+ gas mixture) is desired, optionally with a good mechanical flexibility (elastic deformation required without fatigue) and optionally with a thermomechanical strength over a wide temperature range, typically from −60° C. to +110° C., without impairment of the preceding properties.

The reactive rotomoulding used in the present invention makes it possible to produce a finished product rapidly (in a few minutes) and in a single step, compared to four steps by the molten route of the prior art. The rotomoulding step is facilitated due to lower temperatures (little oxidation, chain scission, risk of polycondensation, etc.) and an environment (preferably, an inert and dry atmosphere) that is less critical than in the processes of the prior art. The industrialization is therefore easier. Furthermore, the final PA-6 synthesized in situ has improved properties as can be seen throughout the examples below. Finally, it is easier to very readily modify the final properties of the polymer through the choice and the amount of activator, catalyst and additives used.

Other advantages may yet appear to a person skilled in the art on reading the examples below, illustrated by the appended figures, that are given by way of illustration.

EXAMPLES

Example 1

Example of Components for Preparing a Composition According to the Present Invention The components used in the examples below for preparing compositions according to the present invention were the following:

] ε-caprolactam monomer (I): AP CAPROLACTAME™, supplier: DSM Fibre Intermediate B.V., melting point: 69° C.;

ε-caprolactam activator (II): AKTIVATOR 0™, supplier: Bruggemann Chemical, form: liquid, melting point: −13° C.;

ε-caprolactam catalyst (III): NYRIM 1 CATALYST™ as catalyst (III) (bromure de(hexahydro-2H-azepin-2-onato-N)magnesium, supplier: Bruggemann Chemical, form: flakes at ambient temperature, melting point at 70° C.; and ε-caprolactone additive: NYRIM ADDITIVE 6® as additive (IV) sold by DSM RIM NYLON VOF, form: liquid at ambient temperature, boiling point around 260° C. at 760 mm Hg, melting point below 0° C.

The chemical formulae of these components (I), (II), (III) and (IV) were the following:

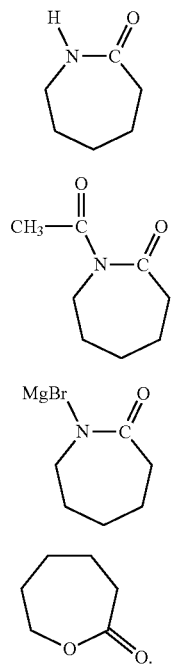

In the examples below, they are respectively referred to as "monomer", "activator", "catalyst" and "additive".

Figure 16C:
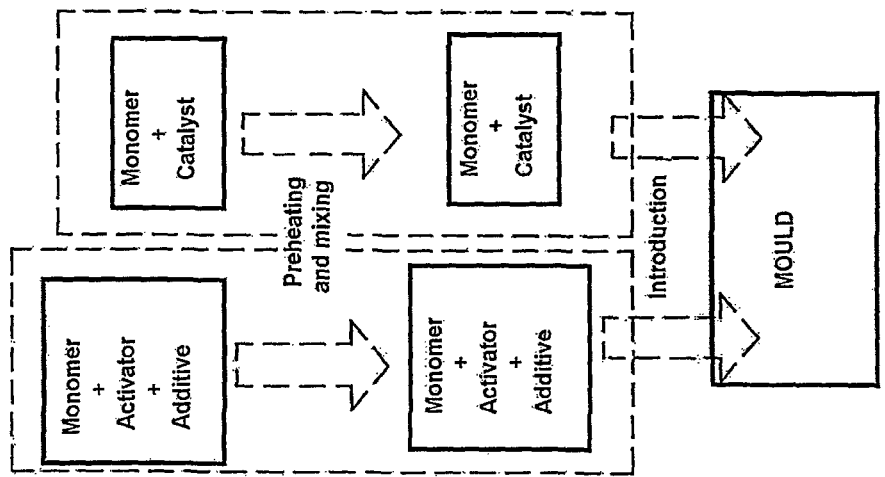
FIGS. 16A, 16B and 16C schematically present various mixing methods that make it possible to obtain the composition of the present invention that can be used for implementing the process of the present invention.
Figure 16B:
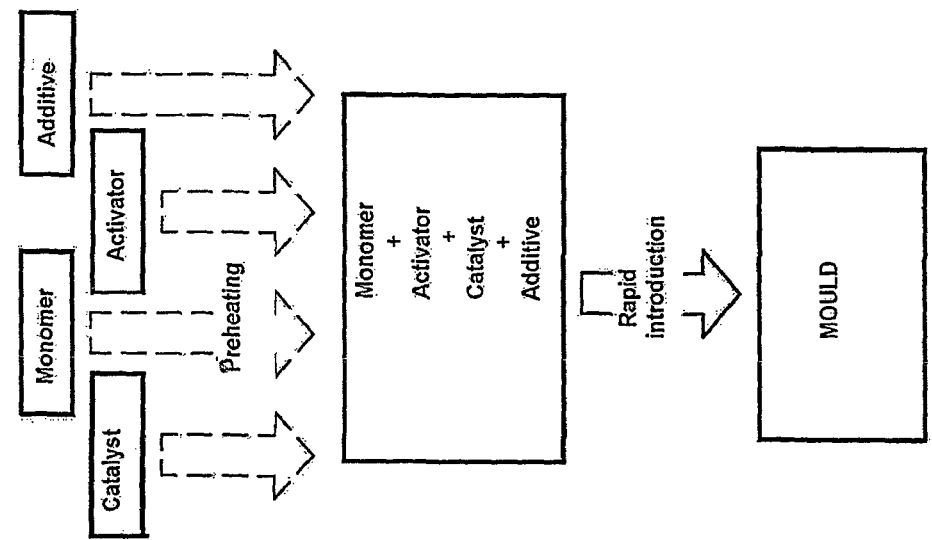
Figure 16A:
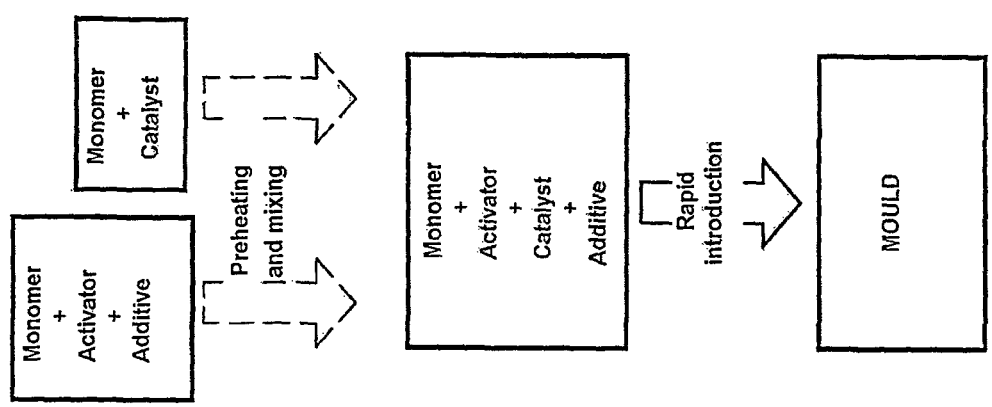

The appended FIGS. 16a to 16c show three examples for preparing and preheating premixes starting from these components, before introduction into the rotomould to carry out the polymerization.

Example 2

Example of Devices for Implementing the Process of the Invention

To produce premixes as indicated in the appended FIG. 16a or 16c, a Bronk™ mixer, model NCU 75/6 was used. This mixture was composed of two chambers (compartments) made of stainless steel introduced into which will be, on one side, a caprolactam+catalyst mixture and, on the other side, a caprolactam+activator+additive mixture. An internal mechanical system for each chamber made it possible to mix its two premixes and to preheat them.

Each chamber of the mixer was equipped with a system that made it possible to inject dry nitrogen inside the chambers in order to degas the components used and to keep them under a dry and inert atmosphere.

Each chamber of the mixer was also equipped with a metering piston that made it possible to inject a defined quantity of each premix into the rotomould.

Mixing or contact between the two premixes was carried out outside the mixer using a double-channel nozzle that made it possible to inject the mixture obtained into the rotomould.

The rotomould used in these examples was of the Shuttle type, from the brand STP Equipment, and referenced LAB40. In order to heat the rotomould, an electric oven was used. Vents were provided for sparging with dry nitrogen during the implementation of the rotomoulding processes.

Before injection of the components, premixes or of the mixture into the rotomould, an aluminium socket was attached to the mould, in the manner described in document [23], after optionally having been subjected to a treatment, for example such as that described in document [4].

The socket was equipped with a funnel that facilitated the introduction of the components or of the premixes into the rotomould.

Example 3

Production of an Envelope and Tests on the Composition of the Invention

The composition used in this example was the following in % by weight: 80.6% of ε-caprolactam monomer, 0.4% of activator, 4% of catalyst and 15% of additive. In this example, the total amount of composition used to form the envelope was 397 g. The volume of the envelope formed was 3 L.

The ε-caprolactam monomer and the ε-caprolactam catalyst were purged just after weighing of these components, using dry nitrogen.

The components were preheated, mixed together, then rapidly introduced into the rotating rotomould as shown in FIG. 16b. The rotomould was heated in an oven up to a temperature of 160 to 190° C.

The mould was rotated at a rotational speed of the primary axis of 9 rpm and of the secondary axis of 6 rpm. The ratio of the rotational speeds (primary/secondary ratio) was equal to 1.5.

Figure 1:
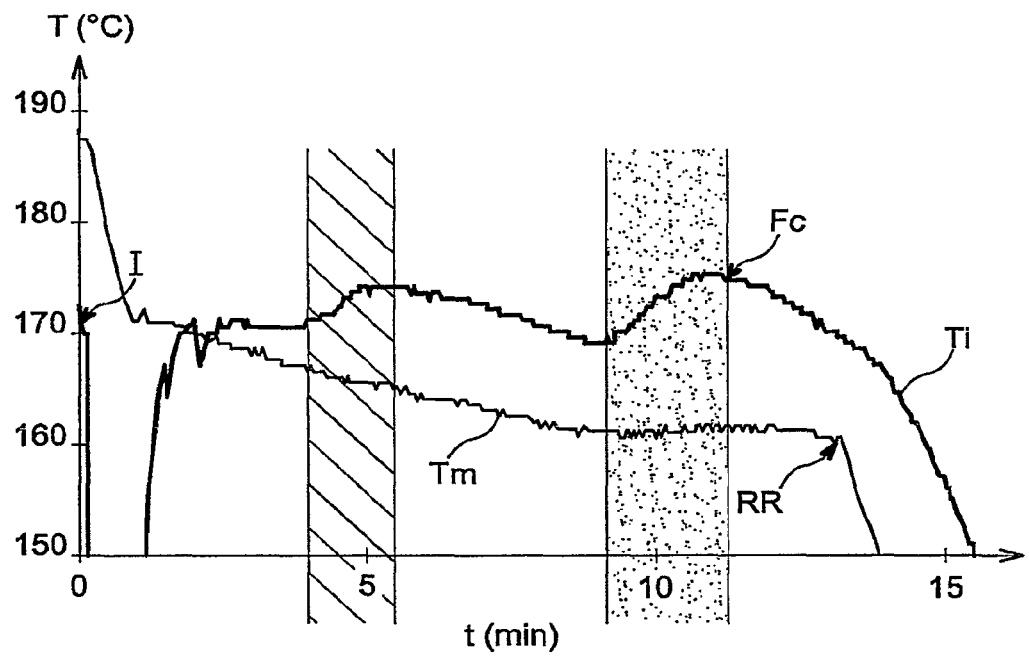
FIG. 1 represents a typical curve of temperature (T in ° C.) as a function of time (t in minutes) for reactive rotomoulding using the composition of the present invention (from the injection onwards, the mould remains outside of the oven).
Figure 2:
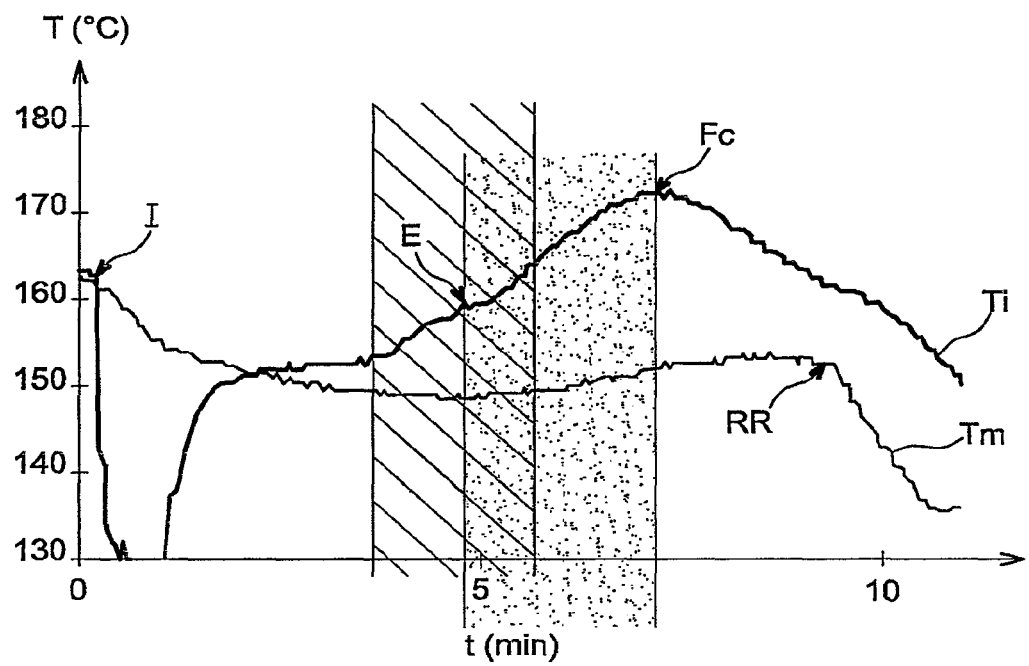
FIG. 2 represents a curve of temperature (T in C) as a function of time (t in minutes) for reactive rotomoulding with rapid polymerization using a composition according to the present invention in which, relative to the composition used to obtain the curve from FIG. 1, a larger amount of catalyst and of activator is added (from the injection onwards, the mould remains outside of the oven).
Figure 3:
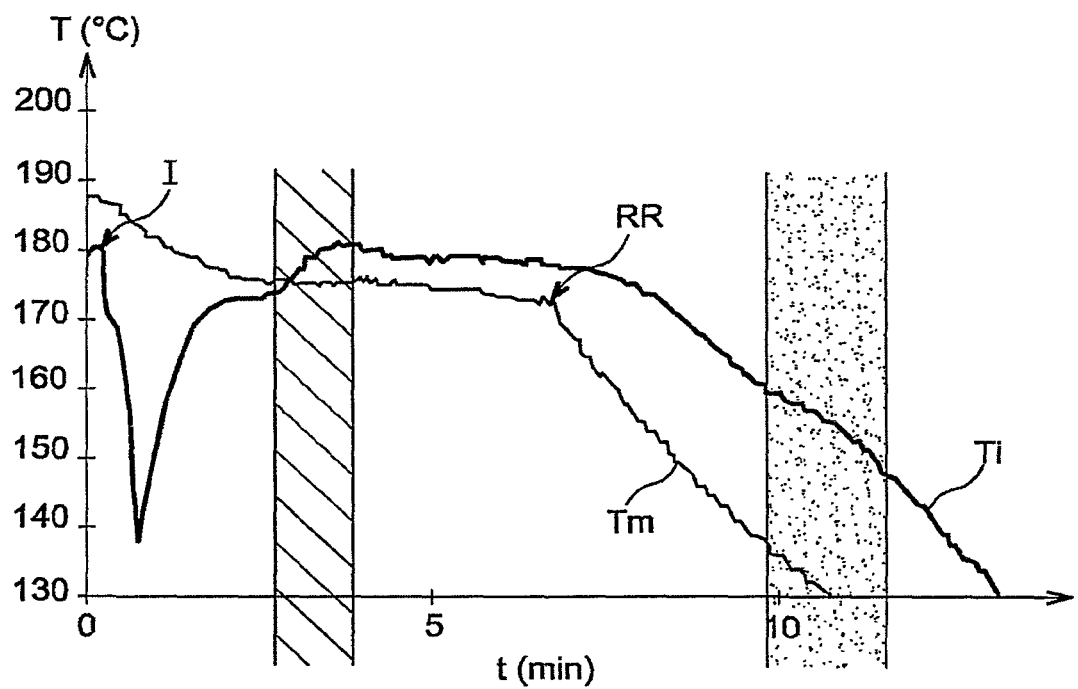
FIG. 3 represents a curve of temperature (T in ° C.) as a function of time (t in minutes) for reactive rotomoulding with belated crystallization (low catalyst content, presence of additives disrupting the crystallization) (from the injection onwards, the mould remains outside of the oven).

The appended FIGS. 1 to 3 collate various temperature measurements carried out in this example. On these figures, the change in the temperature of the mould (Tm) and the change in the temperature of the air inside the mould (Ti) are shown. The hashed zones indicate the period during which polymerization took place and the dotted zones indicate the period during which crystallization took place. The moment of the injection of the composition into the rotomould is shown by the reference "I" and "RR" shows the beginning of the drop in temperature subsequent to the cooling of the mould (rapid cooling). "Fc" indicates the end of the crystallization. For the three figures, starting from the injection, the mould remains rotating outside of the oven.

Represented in FIG. 1 are typical temperature curves for reactive rotomoulding starting from the aforementioned composition. From the injection onwards, the mould remained outside of the oven. The exotherms represented in this figure (increase in the temperature) are therefore markers of the polymerization and crystallization steps.

Represented in FIG. 2 are temperature curves for rotomoulding using the aforementioned composition in which, relative to the composition used to obtain the curve from FIG. 1, a larger amount of catalyst and of activator is added. This larger amount corresponds to 1.5 times for each of these components. In this case, the polymerization reaction is faster, the two exothermic peaks may be superposed. Nevertheless, the polymerization is separate from the crystallization in the form of a shoulder (E) at the crystallization peak.

Represented in FIG. 3 are temperature curves for reactive rotomoulding with belated crystallization: low catalyst content, presence of additives disturbing the crystallization. These additives were 10% by weight of a silica type additive. It is remarked that here, the crystallization started in the cooling phase only (after "RR").

The temperature curves (curves obtained using a Datapaq™ system) for a reactive rotomoulding cycle were therefore completely different from those of a conventional rotomoulding cycle (melting of the thermoplastic polymer).

These curves allow precise monitoring of the in situ anionic polymerization and are an invaluable tool for implementing the present invention. From these curves, the process used in this example may be described in the following manner:

1—Heating of the empty mould in a neutral and dry atmosphere: the internal air temperature follows, some fifteen or so degrees below, the change in the temperature of the mould. The heating is faster than for the molten route as the mould is empty.
2—Removing the mould from the oven and stopping the rotation.
3—Injecting the mixture into the mould: the internal air temperature drops due to the lower temperature of the mixture.
4—Rotating the mould: the internal air temperature rises until it stabilizes around 15° C. below the temperature of the mould at the moment of injection. The stabilization time corresponds to the polymerization activation time.
5—Polymerization characterized by an increase in the internal air temperature (exothermic reaction) that is more or less rapid depending on the catalyst content.
6—Crystallization characterized by a second exothermic peak.
7—Rapid cooling that is optional depending on the demoulding temperature, conventionally from 80 to 40° C.
8—Stopping the rotation, opening the mould and demoulding the envelope formed.

The envelope thus formed is neither oxidized nor crosslinked; the polymer has not undergone chain scission (cut) and has neither unmelted material nor residual porosity. Tests showing the physical properties of these parts are explained below.

Example 4

Production of a Multilayer Envelope According to the Invention

In this example the inventors produced "thick" parts by superposition of several polymer layers starting from the composition and from the process of the present invention. This could not be carried out with the compositions of the prior art.

In this example, an impermeable liner having a thickness of 6 mm (3 successive layers of 2 mm), and internal volume of 22 liters (water equivalent) and equipped with two metal sockets was produced.

Two premixes were produced as represented in FIG. 16C using the aforementioned mixer first placed under dry nitrogen and at a temperature of 135° C. Introduced into one of the two compartments were: 1441.5 g of monomer and 143.1 g of catalyst. Introduced into the other compartment were: 1441.5 g of monomer, 536.6 g of additive and 14.31 g of activator.

After homogenization and preheating of each of the two premixes, the injection of 1192.3 g of the mixture (a proportion of each of the premixes: ⅓ from each compartment) into the mould, that had previously been heated to 165° C., was carried out through the vent of the rotomould, using the funnel, to form the first of the three layers.

The mould was rotated with a rotational speed of the primary axis of 6.2 rpm and of the secondary axis of 23.3 rpm. The ratio of the rotational speeds (primary/secondary ratio) was equal to 0.27.

Figure 13:
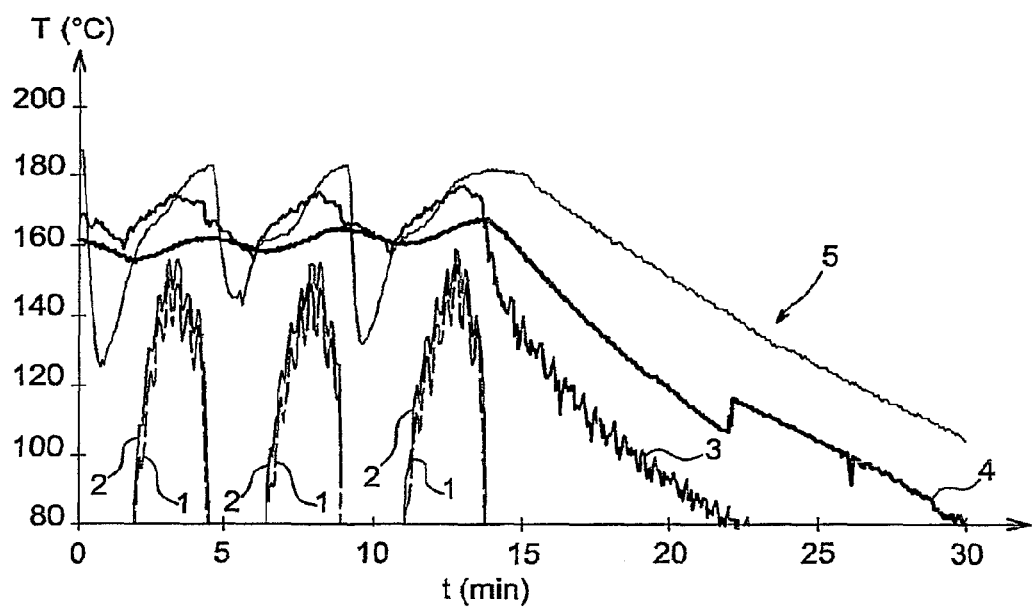
FIG. 13 is a Datapaq™ curve of the temperature (T in ° C.) cycle as a function of time (t in minutes) for a 22 L liner made of PA-6 obtained by reactive rotomoulding (injection of layer 1 (C1) at t=0) starting from a composition according to the invention.

The mould was kept at temperature in the oven for the three layers in order to obtain a very good repetition of the temperature cycle of each layer, as can be seen in the graph from appended FIG. 13 showing the change in the temperature (mould, socket and internal air) as a function of the time (t in minutes). This figure shows a Datapaq™ curve of the temperature cycle during the manufacture of this 22 L PA-6 liner obtained by reactive rotomoulding (injection of layer 1 (C1) at t=0) according to this example. The temperature peaks ranging from 80 to 156° C. correspond to the temperature measurements of the air outside the rotomould during rotomoulding using two temperature sensors (curves 1 and 2). The other curves show the change in the temperature of the mould (curve 3), of the socket (curve 4) and of the internal air (curve 5).

Thus, from a composition according to the invention and from a process such as described in Example 2, the steps of preparation of the composition, and of polymerization and crystallization in the rotomould were carried out three times in a row.

Each layer was injected into the mould as soon as the preceding layer had a sufficient viscosity so as not to flow when the rotation of the mould was stopped and before its complete polymerization in order to ensure an optimal adhesion with the following layer. This step therefore took place when the polymerization was sufficiently advanced, that is to say between 2 and 5 minutes after the injection of the preceding layer into the rotomould. Due to the exothermic nature of the polymerization and the crystallization, and therefore due to a cooling that was overall very slow, it was therefore possible to produce numerous layers. Thus, there was almost no limit to the final thickness.

In this example, the total amount of composition used was 3577 g.

After cooling, the envelope formed was removed from the mould.

Figure 15:
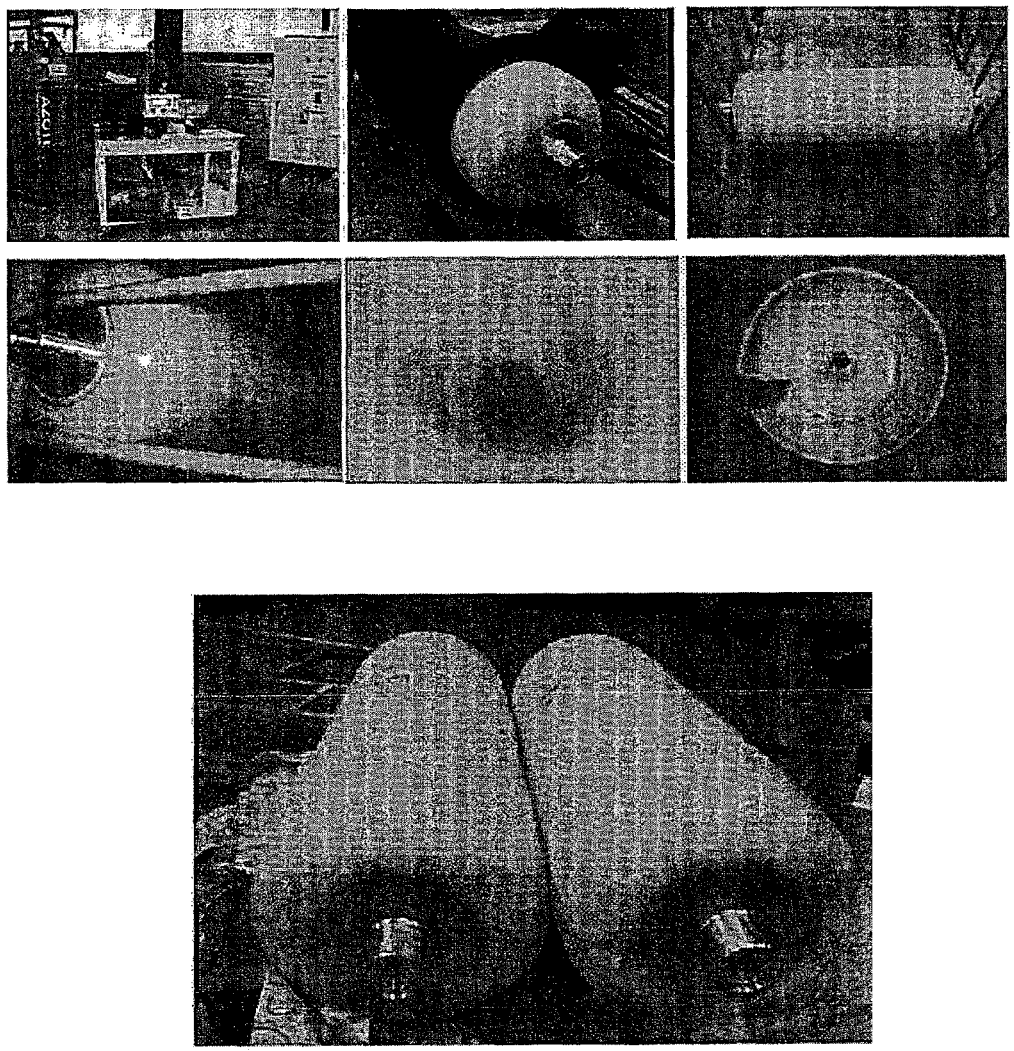
FIG. 15 shows 7 photographs taken during the manufacture of 22 liter impermeable envelopes starting from compositions and the process according to the invention.

The parts obtained are shown in photographs in FIG. 15. In the top left: Bronk™ injection system and neutral gas (nitrogen); in the top middle: envelope obtained with socket during extraction from the rotomould; in the top right and middle left: envelope during the complete cooling. Central photo and middle right photo: inside of the envelope on the socket side and after cutting of the dome covering the socket. At the bottom, two 22 L envelopes (liners) according to the invention with two $2\times10^7$ Pa (200 bar) aluminium sockets. The sockets/envelope connection is very tight, contrary to that of an envelope obtained with a molten rotomoulding procedure according to the techniques of the prior art.

The thermoplastic polymer which was obtained was polyamide 6 (or polycaprolactam) that has the properties indicated in the furthest right-hand column in the comparative table below:

|  | Type of rotomoulding | | | |
|---|---|---|---|---|
|  | Molten route | | Reactive route | |
|  | grade | | | |
|  | Standard PA-6 | Flexible modified PA-6 | Standard PA-6 | Flexible modified PA-6 |
| Polymerization | Hydrolytic | | Anionic | |
| Molar mass kg/mol | 15-50 | | 50-300 | |
| Density g/cm³ | 1.13 | | 1.15 | 1.14 |
| Melting point ° C. | 227 | 227 | 225 | 200 |
| Elastic modulus Mpa | 1400 | 400 | 1900 | 700 |

-continued

| | Type of rotomoulding | | | |
|---|---|---|---|---|
| | Molten route grade | | Reactive route | |
| | Standard PA-6 | Flexible modified PA-6 | Standard PA-6 | Flexible modified PA-6 |
| Tensile strength Mpa | 65 | 40 | 75 | 45 |
| Elongation at break % | 30 | nd | 70 | >300 |

The molten route PA-6 used was TECHNYL C217™ from Rhodia Engineering Plastics (France). The flexible modified PA-6 was obtained by addition of elastomer units. The standard (reactive route) PA-6 corresponded to a composition that did not contain an .epsilon.-caprolactone type additive.

The standard anionic PA-6 had, in the main, a higher performance than the standard hydrolytic PA-6 of the prior art via molten route (molten route column) (elastic modulus, tensile strength and elongation at break were better). Furthermore, the compositions of the present invention (reactive route-flexible modified PA-6) made it possible to obtain mechanical properties that were closer to polyethylene (PE) and therefore more in adequacy with the desired properties for the type IV tank liner application (desired ductility).

Example 5

Other Multilayer Tests According to the Invention

With a composition and a procedure as in Example 4, a 3 L three-layer structure was prepared. It was not necessary to put the rotomould back into the oven for each layer, since the polymerization reaction was exothermic it generated a sufficient temperature for the anionic polymerization of the following layer taking into account the small amount of material to be polymerized.

Figure 4:
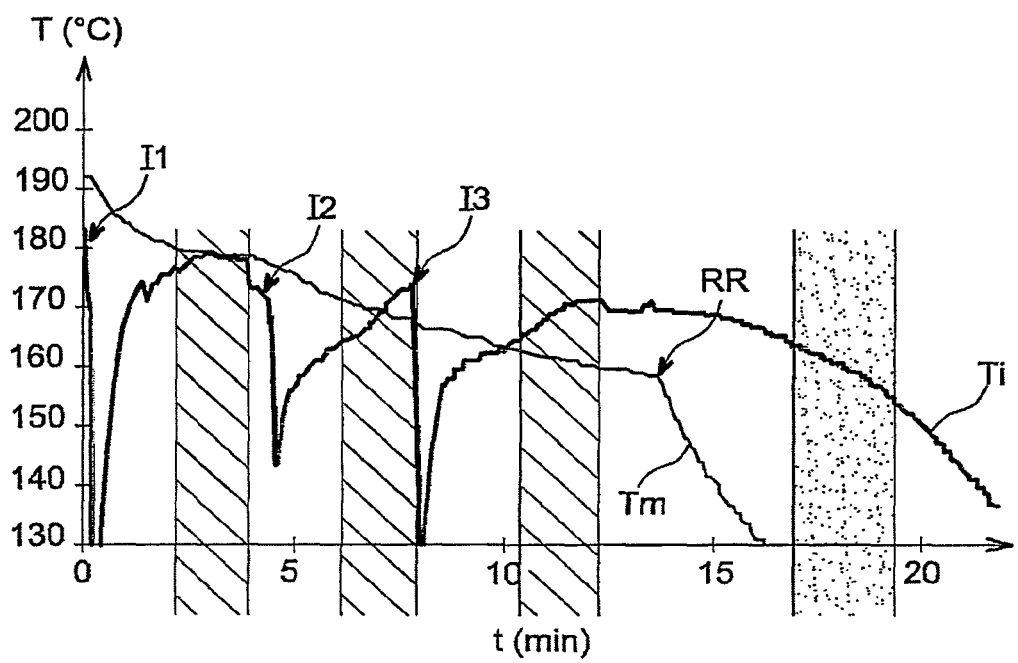
FIG. 4 represents a curve of temperature (T in ° C.) as a function of time (t in minutes) for three-layer reactive rotomoulding obtained by repeating steps (a), (b) and (c) of the process of the invention several times (from the first injection onwards, the mould remains outside of the oven).

The appended FIG. 4 represents a temperature curve (T expressed in ° C.) for the three-layer reactive rotomoulding as a function of time (t expressed in minutes) obtained in this example, by repeating the steps (a), (b) and (c) of the process of the invention several times (from the first injection onwards, the mould remained outside of the oven). The curve with the heavy line represents the change in the internal air temperature in the mould and the curve with the fine line represents the change in the mould temperature. In this figure the references I1, I2 and I3 respectively represent the first, second and third injections, and the hatched zones respectively represent, from the left to the right, the polymerization times of the first, second and third layers. The dotted zone itself represents the crystallization time. RR indicates the temperature drop subsequent to the rapid cooling of the mould.

In this example, each polymer layer had a thickness of 2 mm and the total thickness was 6 mm.

Example 6

Examination of the Envelopes Obtained According to the Invention

The first reactive rotomoulding tests were carried out with formulations developed for injection moulding (RIM: Resin Injection Moulding). These formulations had the advantage of having very short reaction times (less than 3 minutes to crystallize). They were however incompatible with the rotomoulding process. Thus the polymer did not have time to cover the whole of the mould before forming and, a fortiori, setting (it should be recalled that this was well below the melting point of the polymer). This resulted in a very high heterogeneity of the thickness, with wall portions that were very thin (a few tenths of a millimeter) and ridges having a thickness of a few centimeters.

Thus, the first part of the development carried out by the present inventors was to find parameters (composition and process) that made it possible to slow down the polymerization until a sufficient homogeneity could be obtained. Many difficulties were encountered due to the fact that all the parameters were interdependent: catalyst content, activator content, mould temperature, rotational speed, time, change in the viscosity, etc.

Figure 5:
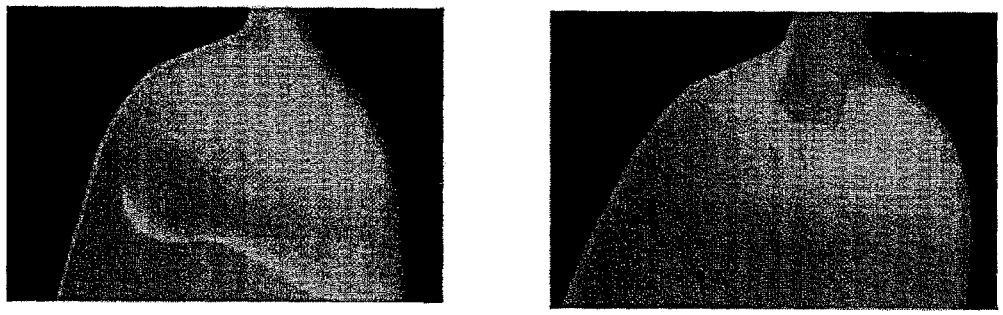
FIG. 5 represents a section of a 3 liter liner: on the left a heterogeneous part obtained with a caprolactam composition and process parameters of the prior art; on the right a homogeneous part obtained due to the composition of the present invention.

The appended FIG. 5 moreover makes it possible to visually compare (photographs) 31 envelopes seen in cross section: [0175] on the left, a heterogeneous part obtained with a caprolactam composition of the prior art and a rotomoulding process; and [0176] on the right, a homogeneous part obtained thanks to the composition of the present invention, with the same rotomoulding process.

Quite obviously, the composition of the present invention makes it possible to achieve the desired objectives.

Analyses of cross sections were carried out on multilayer envelopes obtained as in Example 4. The bonding problems that can be encountered in "molten route" multilayers of the prior art were nonexistent for the envelopes obtained in accordance with the present invention since the polymerization was continuous from one layer to another. However, it is possible to visually distinguish the layers from one another due to their difference in transparency.

Figure 6:
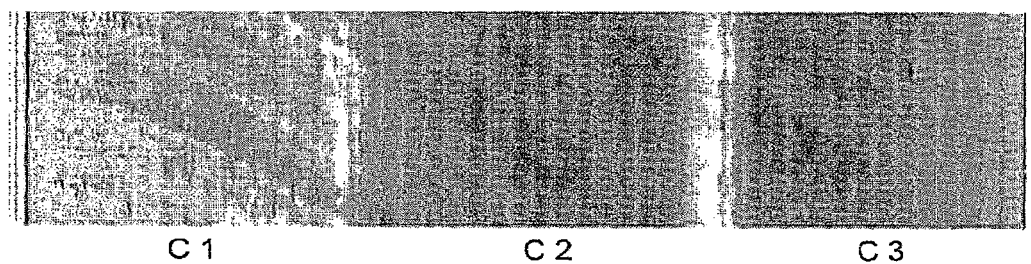
FIG. 6 is a photograph of a cross-sectional view of a three-layer envelope (layers 1, 2 and 3) obtained from the composition of the present invention: mould side on the left, internal air side on the right.

The photograph from FIG. 6 represents a cross section of the three-layer structure obtained (3×2 mm): mould side on the left, layer 1 (C1), layer 2 in the middle (C2) and layer 3 on the internal air side of the rotomould on the right (C3).

Figure 7:
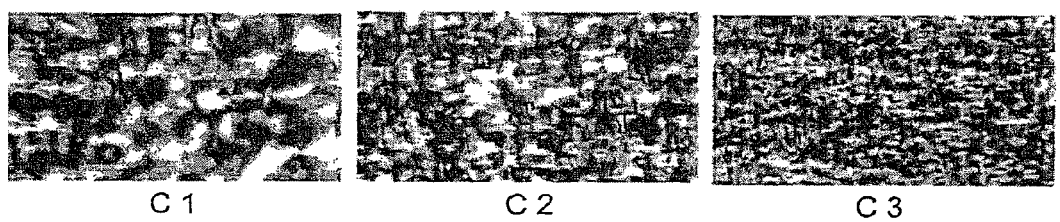
FIG. 7 is a photograph of the spherulites from layers 1, 2 and 3 of the three-layer envelope from FIG. 6.

The difference in transparency of the three layers can be explained by the size of the spherulites which compose them. This is because the latter are large for layer 1 (C1) (around 20 .mu.m), medium for layer 2 (C2) (around 10 μm), and small for layer 3 (C3) (around 5 μm) as can be seen in the photograph from FIG. 7. These differences can be attributed to the decrease in heat transfer between the mould and the polymer as the layers are formed.

Figure 8:
FIG. 8 is a photograph of the interphase between layers 2 (on the left, area with large spherulites) and 3 (on the right) of the three-layer envelope from FIG. 6.

Furthermore, from the photograph of appended FIG. 8, a transition zone in terms of the size of spherulites between layer 2 (on the left—zone with medium spherulites) and layer 3 (on the right-zone with small spherulites) can be observed. This zone belongs to layer 2 but has been modified by the injection of layer 3. This continuous interphase participates in the mechanical cohesion of the assembly since the macromolecular chains of each layer are tightly bound and interpenetrated with the adjacent layer or layers.

Example 7

Properties of Envelopes Obtained from a Composition of the Present Invention

In the experiments from this example:
The composition of the invention was that from Example 3.
The PA-6 used for the molten route was TECHNYL C217™ from Rhodia Engineering Plastics (France).
The additive-free composition was the same as that from Example 3, but without an ϵ-caprolactone additive.

A. Microstructure and Crystallinity

Besides the melting points and the degrees of crystallinity, differential scanning calorimetry (DSC) tests make it possible to demonstrate various particularities of the polymer formed: for example, various crystalline phases, the presence of unpolymerized caprolactam, water uptake, postpolymerization and, generally, the polymerization state of the PA-6.

Figure 9:
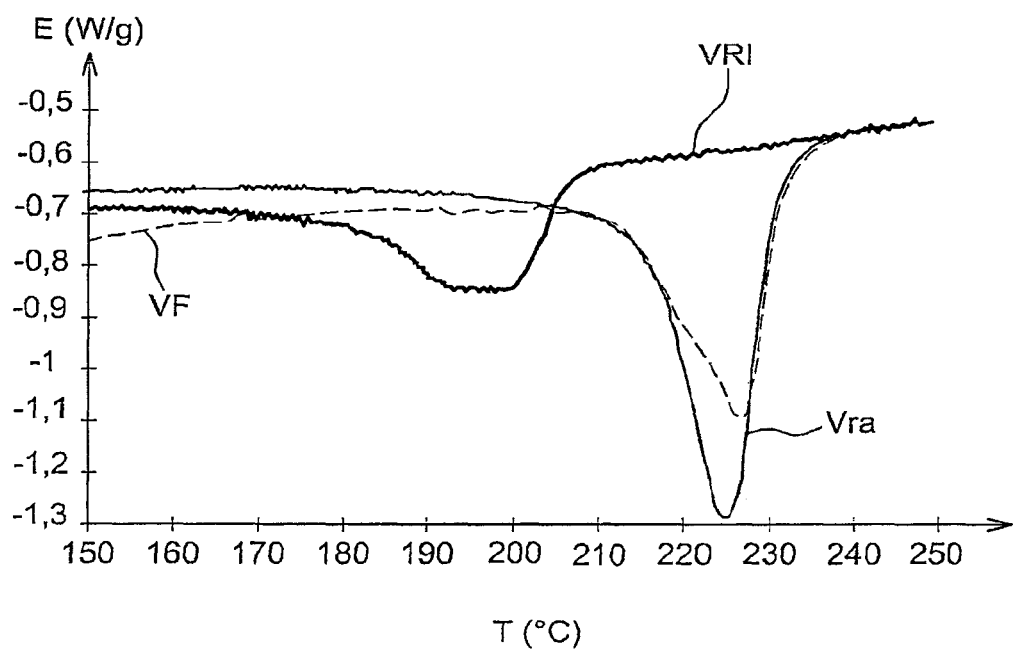
FIG. 9 represents a graph (energy W/g as a function of the temperature T in ° C.) that collates the results of differential scanning calorimetry (DSC) analyses on rotomoulded PA-6 obtained by a molten route according to the prior art (broken line); on rotomoulded PA-6 obtained by a reactive route with a composition of the prior art without an additive (fine line) and on rotomoulded PA-6 obtained by a reactive route with a composition of the present invention (with additive) (heavy line).

The appended FIG. 9 represents a graph that collates the results of DSC analyses on rotomoulded PA-6 obtained by the molten route of the prior art (VF); on rotomoulded PA-6 obtained by the reactive route with an additive-free composition from the prior art (Vra), and on rotomoulded PA-6 obtained by the reactive route with a composition of the present invention (VRI) (heavy line).

It is firstly noted that the temperature of the melting peak of the PA-6 obtained by the reactive route (additive-free) was (slightly) lower than that of the melting peak of the PA-6 obtained by the molten route. This shows that this material has slightly thinner lamellae, which is favourable for the barrier property to fluids, including gas, and for the mechanical property (more ductile material).

The additive used according to the present invention acted on the monomer during the polymerization. It was integrated into the macromolecule (polymer) by forming a sort of block copolymer, providing an unexpected mechanical flexibility effect. This modification of the molecule modified the crystallization and therefore modified the final properties of the envelope obtained. On a practical level, the additive 6 was used with the activator, which it partly consumed. Very liquid at ambient temperature, it had the advantage of mixing very readily with the caprolactam and of being able to be used at contents greater than 10% by weight. The additive was tested at contents of 5%, 10% and 15% by weight, without significant modification of the heating cycle and of the polymerization (the ratio between the other components not having been modified). On the other hand, the appearance and the mechanical properties were greatly and favourably modified, which was the desired effect.

The DSC measurements show, in this figure, that the parts obtained with the composition of the present invention (heavy line) had a melting peak at a lower temperature (30° C. less) whose endotherm was smaller and more spread out, meaning that the polymer obtained had smaller crystalline lamellae (platelets). Furthermore, the melting peak during the second heating was found in the same position as during the first heating, which confirms the significant modification of the molecular chain. This observation is evidence of the stability of the material and signifies a complete polymerization. These measurements show an incontrovertible improvement provided thanks to the composition of the present invention.

B. Tensile Mechanical Behaviour

Tensile tests were carried out according to the ISO 527 standard on type H2 dumb-bell test pieces (working length of 25 mm) at a pull rate (traverse speed) of 25 mm/min. Several test conditions were tested: ambient temperature for non-oven-cured test pieces and temperatures of −40, −10, 20, 50 and 85° C. for oven-cured test pieces.

Overall, the anionic PA-6 polyamides obtained from the composition of the invention had a slightly greater rigidity than the hydrolytic PA-6 polyamides, as they had a higher molecular weight. On the other hand, the elongation at break was variable depending on the activator content.

Figure 10:
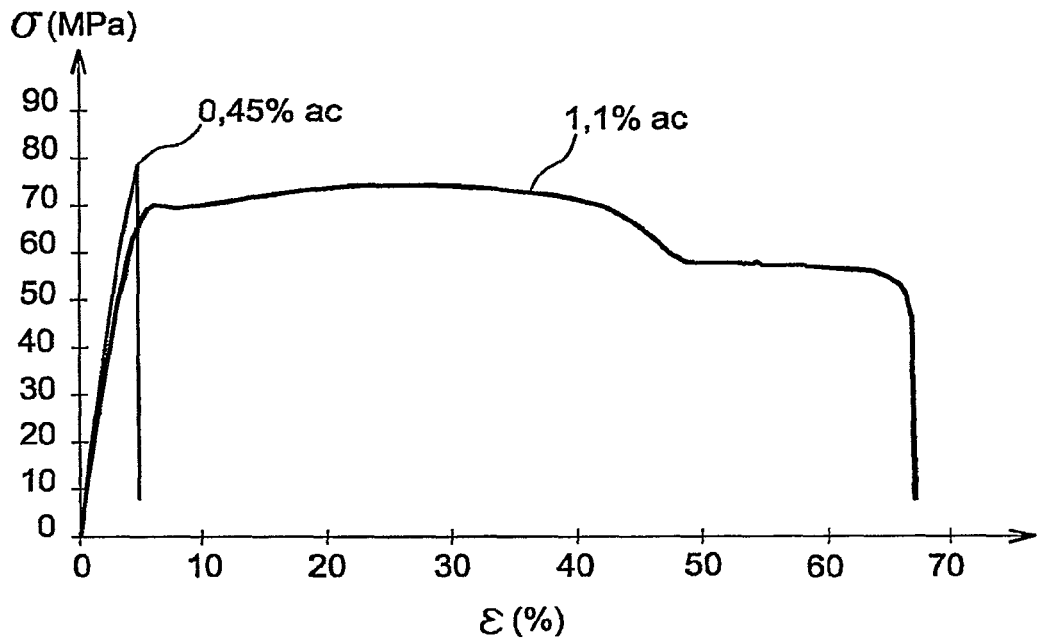
FIG. 10 represents a graph (stress (σ) in MPa as a function of strain (ε) in %—uniaxial tensile curve at 20° C.) showing the influence of the activator content in the composition of the present invention on the elongation at break.

This is because, as shown in the appended FIG. 10, the elongation changed from 5% to 65% when the activator content changed from 0.45% by weight (curve "0.45% ac" in FIG. 10) to 1.1% by weight (curve "1.1% ac" in FIG. 10). This can be explained by an elongation of the chains at a low activator content, thus promoting the bonds between each lamella and the entanglements of the amorphous phase. Higher elongations could not be obtained (without additives) due to the great difficulty in polymerizing with such low activator contents, the lower limit of which was around 0.3%.

Since the glass transition temperature was close to 40° C., the behaviour of the PA-6 varied little from −40° C. to +20° C. On the other hand, starting from 50° C., the flexibility and the ductility greatly increased.

Figure 11:
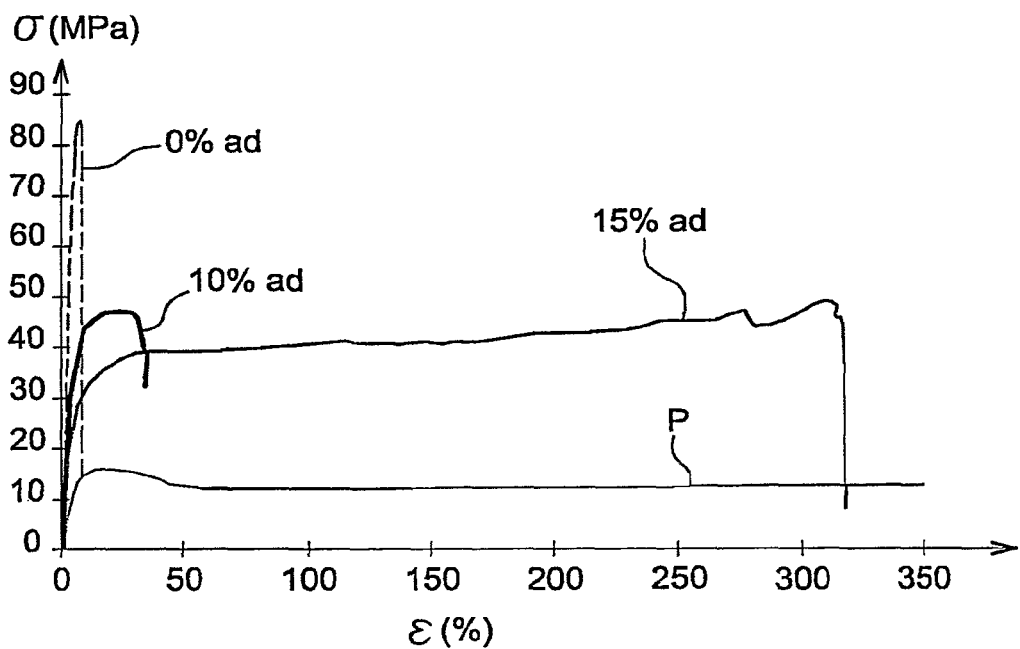
FIG. 11 represents a graph (stress (σ) in MPa as a function of strain (ε) in %—uniaxial tensile curve at 20° C.) showing the influence of the additive concentration in the composition of the present invention (tests at 0 (dotted line), 10 (heavy line) and 15% (fine line) by weight of the composition) on the mechanical characteristics of a rotomoulded envelope (stress (σ) in MPa, as a function of the strain (ε) in %). For comparison, a curve resulting from equivalent tests carried out on a polyethylene envelope is also represented.

On the mechanical level, the tensile tests represented in FIG. 11 very clearly show the effect of the additive in the composition of the present invention, in particular starting from an addition of 10% of additive (curve "10% ad" in FIG. 11). The Young's modulus was divided by 3 (from 2200 MPa to 700 MPa) when moving from 0% (curve "0% ad" in FIG. 11) to 15% of additive (curve "15% ad" in FIG. 11) which brings it to a rigidity comparable to that of a high density polyethylene (curve p).

The elongation at break was itself also considerably increased: changing from 10 to 300% elongation per 0 and 15% of additive 6 respectively. The damage was of ductile type characterized by a very clearly marked necking. The fracture took place after the necking phase. Similarly, the stress at the yield point was decreased by around two. These measurements show an incontrovertible mechanical improvement provided thanks to the composition of the present invention.

C. Gaseous Hydrogen Barrier Performance

Figure 12:
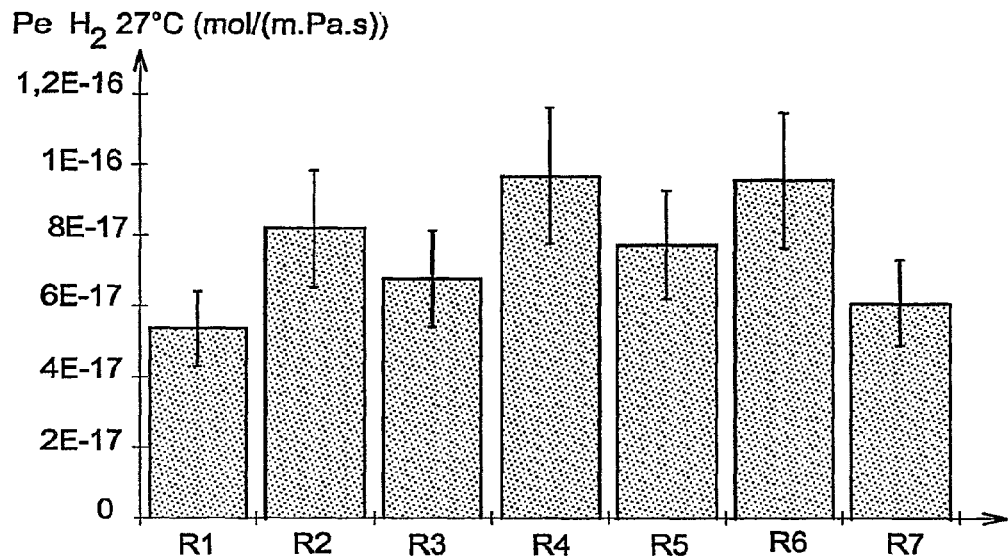
FIG. 12 is a graph showing the change in the permeability coefficient (Pe) measured for various PA-6 samples manufactured by reactive rotomoulding from the composition of the present invention (hydrogen permeability coefficient at 27° C.) (Pe $H_2$ at 27° C.) in mol/(mPas)).

Measurements of permeability to hydrogen (27° C., 50 bar) were carried out and collated in graph form in appended FIG. 12.

The first measurements on the reactive routes showed a better impermeability of the reactive route PA-6 polyamides than the molten route PA-6 polyamides of the prior art (factor of around 2) (not shown).

The smaller lamellae (platelets) and the shorter distance between the lamellae were the reasons for the increase in the tortuosity of the material.

Tests carried out at $7 \times 10^7$ Pa (700 bar) on samples confirmed the good performance of the PA-6 polyamides obtained by reactive rotomoulding from the composition of the present invention, since the permeability coefficient (Pe) was around $4 \times 10^{-17}$ mol/(mPas), i.e. a coefficient lower, by a factor of around 5 to 10, than that which is required by the current draft standards (ISO TC 197 and EIHP II) in terms of allowable leakage levels for tanks (1 cm$^3$/l/h).

Tests on a complete tank ($200 \times 10^5$ Pa (200 bar), 27° C., hydrogen) confirmed the results obtained with these samples.

Example 8

Manufacture of a Type IV Tank

Figure 14:
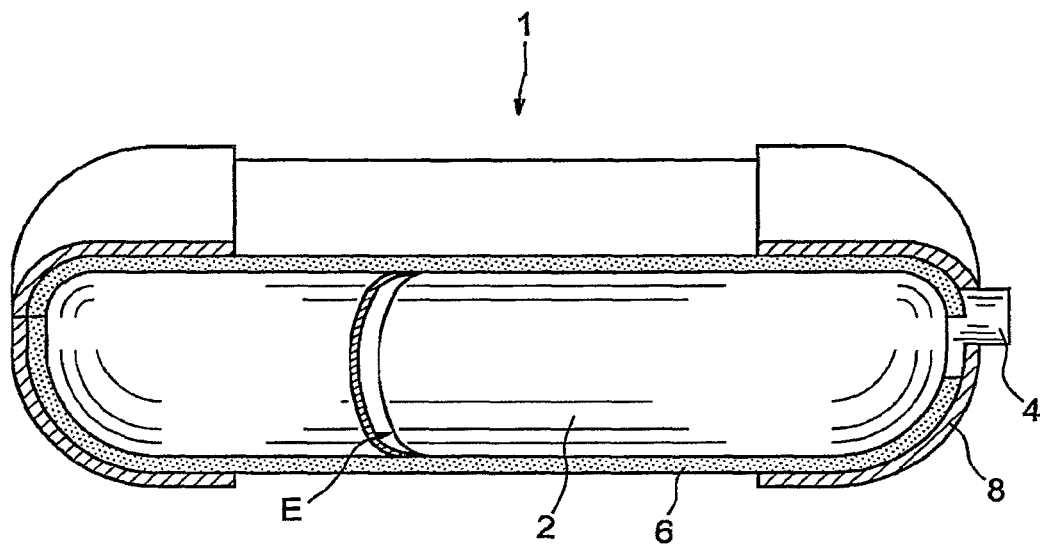
FIG. 14 schematically represents an example of the structure of a type IV tank (1) manufactured from an envelope (2) obtained from a composition according to the present invention. This figure represents the functionalities of the various components which form this tank.

The tank (1) manufactured is represented in the appended FIG. 14. In this example, the envelope (E) manufactured in the Example 3, equipped with its socket (4) was equipped with a reinforcing structure (6). For this, carbon fibres previously impregnated with non-crosslinked epoxy resin were wound around the envelope held by the socket (the liner served as a mandrel) according to one of the processes described in documents [4], [5], [24] or [25].

A few layers of glass fibres impregnated with uncrosslinked epoxy resin were then wound like for the carbon fibres. The spooled tank was then placed in a rotating oven in order to cure the epoxy resin.

A protective shell (8) could then be placed around the filament winding as shown in cross section in FIG. 14. A valve/regulator may be screwed into the tank, in the socket (not shown).

A type IV tank was thus obtained. This tank had the aforementioned sealing specifications.

Example 9

Post-Treatment of a Liner Obtained According to the Process of the Invention

An envelope manufactured according to the process of the present invention, for example according to the procedure from Example 2, could be subjected to a post-treatment such as those cited in the above detailed description of the invention, in order to improve its sealing properties and also its chemical properties of the inner and/or outer surface.

Examples of post-treatments that can be applied to the liner are described in documents [26] and [27] from the appended list of references.

Example 10

Manufacture of a Hydraulic Accumulator

Figure 17:
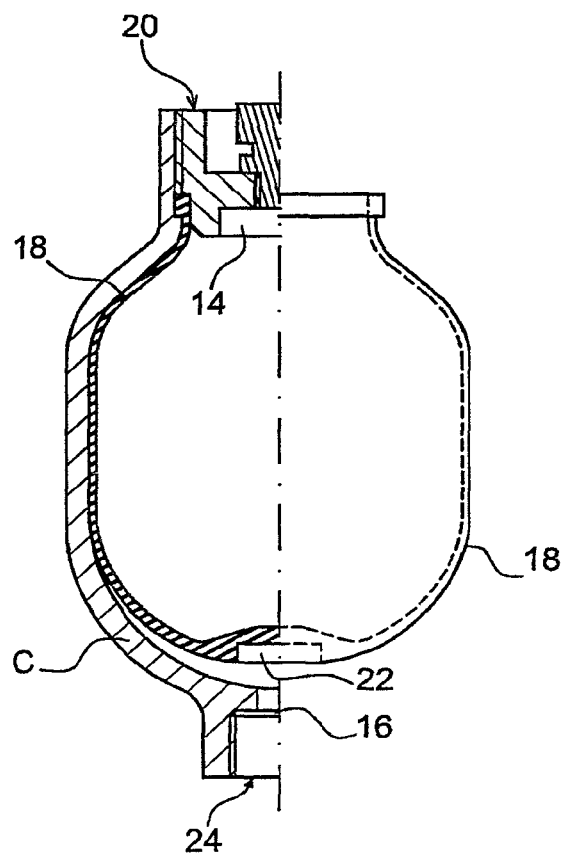
FIG. 17 schematically represents an example of the structure of a hydraulic accumulator (10) manufactured from an envelope (2) obtained from a composition according to the present invention. This figure represents the functionalities of the various components which form this accumulator.

The hydraulic accumulator (10) manufactured in this example is represented in the appended FIG. 17.

In this example, a type IV tank was manufactured as in Example 8 except that it was equipped with two sockets (14 and 16) which made it possible to install the connector of the accumulator (as in Example 4 above).

The body (C) of the accumulator was therefore composed of said type IV tank equipped with its two sockets (14 and 16).

For the assembly of the accumulator, the procedure as indicated in document [37] from the appended list of references was followed. A flexible internal pocket (18) made of rubber was placed in the type IV tank, and the first connector (20), to which the pocket was connected in a leaktight manner, at the socket (14), was installed. An anti-extrusion pellet (22) was attached to the pocket to prevent it from exiting the tank via extrusion through the second connector (24) during the use of the accumulator. In this example, the pellet was made of vulcanized plastic.

The connector (20) comprised a supply valve through which it was possible to introduce a volume $V_0$ of inert gas into the flexible pocket (18) at a pressure $P_0$ suitable for use of the accumulator. The pocket could thus be "inflated" in the tank.

The second connector (24) was then positioned at the socket (16) so as to be able to introduce a fluid at a pressure $P_1$ into the tank, around the flexible pocket. This connector was such that it could be connected to a fluid circulation pipe.

Thus, when the accumulator was connected to the fluid circulation pipe, the fluid penetrated into the accumulator and the pressure $P_1$ of the fluid in the pipe was therefore present in the accumulator around the flexible pocket (18). When the pressure $P_1$ of the circuit exceeded the inflation pressure $P_0$ of the flexible pocket of the accumulator, said pocket contracted and the gas compressed, reducing its volume to $V_1$. By further increasing the pressure to $P_2$ ($P_2$ being greater than $P_1$), the volume of gas in the flexible envelope was further compressed and changed to a volume $V_2$. The accumulator then had a pressurized fluid volume of $V=V_1-V_2$.

A functional hydraulic accumulator was thus obtained. This accumulator had the sealing specifications cited in the examples above. This accumulator had a capacity of 3.5 liters and an operating pressure of $2.5 \times 10^7$ Pa (250 bar). The maximum pressure ($P_2$)/pressure at rest ($P_0$) ratio was 4:1 in this example. It could of course be different in other cases.

A protective shell could of course be placed around the filament winding as in Example 8 and as shown in cross section in FIG. 14 (not shown in FIG. 17).

What is claimed is:

1. A composition comprising in % by weight relative to the total weight of the composition:
    from 70 to 90% of an ε-caprolactam monomer of formula (I);
    from 0.1 to 1% of an ε-caprolactam activator of formula (II), in which R is selected from the group consisting of $C_nH_{2n+1}$, n being an integer chosen from 1 to 10; —OH; —$OC_nH_{2n+1}$, n being an integer chosen from 1 to 10; and —NHR' where R' is either $C_nH_{2n+1}$, n being an integer chosen from 1 to 10, or an amine functional group;
    from 2 to 6% of an ε-caprolactam catalyst of formula (III), in which X is chosen from the group consisting of MgBr, MgI, Li and Na; and
    from 10 to 20% of an ε-caprolactone additive of formula (IV);
    wherein the formulae (I), (II), (III) and (IV) are the following:

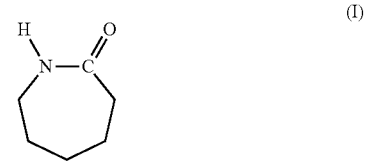

(I)

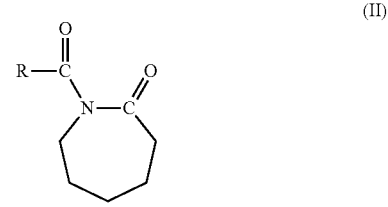

(II)

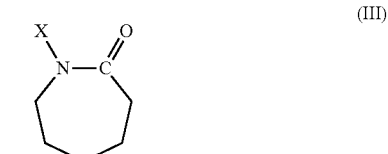

(III)

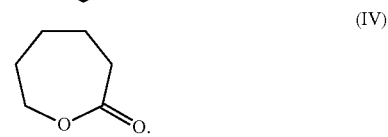

(IV)

2. The composition according to claim 1, comprising in % by weight:
    from 80 to 81% of said ε-caprolactam monomer;
    from 0.3 to 0.5% of said ε-caprolactam activator;
    from 3.5 to 4.5% of said ε-caprolactam catalyst; and
    from 14 to 16% of said ε-caprolactone additive.

3. The composition according to claim 1, comprising in % by weight:
    80.6% of said ε-caprolactam monomer;
    0.4% of said ε-caprolactam activator;
    4% of said ε-caprolactam catalyst; and
    15% of said ε-caprolactone additive.

* * * * *